United States Patent
Choi et al.

(10) Patent No.: US 10,347,939 B2
(45) Date of Patent: Jul. 9, 2019

(54) ELECTROLYTE MEMBRANE FOR ENERGY STORAGE DEVICE, ENERGY STORAGE DEVICE INCLUDING THE SAME, AND METHOD OF PREPARING ELECTROLYTE MEMBRANE FOR ENERGY STORAGE DEVICE

(71) Applicant: Samsung Electronics Co., Ltd., Suwon-si, Gyeonggi-do (KR)

(72) Inventors: Hongsoo Choi, Seoul (KR); Yonggun Lee, Incheon-si (KR); Jenam Lee, Seongnam-si (KR); Wonseok Chang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 861 days.

(21) Appl. No.: 14/951,734

(22) Filed: Nov. 25, 2015

(65) Prior Publication Data

US 2016/0336619 A1 Nov. 17, 2016

(30) Foreign Application Priority Data

May 12, 2015 (KR) .......................... 10-2015-0066251

(51) Int. Cl.
*H01M 10/0565* (2010.01)
*H01M 10/052* (2010.01)
*H01G 11/56* (2013.01)

(52) U.S. Cl.
CPC ........ *H01M 10/0565* (2013.01); *H01G 11/56* (2013.01); *H01M 10/052* (2013.01); *H01M 2300/0082* (2013.01); *Y02E 60/13* (2013.01); *Y02T 10/7022* (2013.01)

(58) Field of Classification Search
None
See application file for complete search history.

(56) References Cited

U.S. PATENT DOCUMENTS

| | | |
|---|---|---|
| 9,105,940 B2 | 8/2015 | Lee et al. |
| 2010/0226991 A1 | 9/2010 | Horcajada-Cortes et al. |
| 2011/0003210 A1 | 1/2011 | Lim et al. |
| 2011/0138999 A1 | 6/2011 | Willis |

(Continued)

FOREIGN PATENT DOCUMENTS

| | | |
|---|---|---|
| KR | 1020110003131 A | 1/2011 |
| KR | 1020110122472 A | 11/2011 |

(Continued)

OTHER PUBLICATIONS

Andrew R. Millward et al. "Metal-Organic Frameworks with Exceptionally High Capacity for Storage of Carbon Dioxide at Room Temperature", J. Am. Chem. Soc. 2005, 127, 17998-17999.

(Continued)

*Primary Examiner* — Sarah A. Slifka
(74) *Attorney, Agent, or Firm* — Cantor Colburn LLP

(57) ABSTRACT

An electrolyte membrane for an energy storage device, the membrane including a matrix including a first ionically conductive polymer; an alkali metal salt, an alkaline earth metal salt, or a combination thereof; a metal-organic framework; and a second ionically conductive polymer miscible with the first ionically conductive polymer, wherein the second ionically conductive polymer is covalently bound to a portion of or the entire surface of the metal-organic framework through at least one amide bond.

19 Claims, 12 Drawing Sheets

(56) References Cited

U.S. PATENT DOCUMENTS

2016/0064772 A1    3/2016  Choi et al.

FOREIGN PATENT DOCUMENTS

| KR | 1020120031738 A | 4/2012 |
| KR | 10-2016-0024610 A | 3/2016 |

OTHER PUBLICATIONS

J. Spadavecchia et al. "nPEG-TiO2 Nanoparticles: A Facile Route to Elaborate Nanostructured Surfaces for Biological Applications", ACS Appl. Mater. Interfaces 2011, 3, 2637-2642.

Kazuo Murata, et al. "An overview of the research and development of solid polymer electrolyte batteries", Electrochimica Acta (2000) 1501-1508.

Tendai Gadzikwa et al. "Covalent surface modification of a metal-organic framework: selective surface engineering via Cu(I)-catalyzed Huisgen cycloaddition", Chem. Commun. 2008, 5493-5495.

C. Serre et al. "Role of Solvent-Host Interactions That Lead to Very Large Swelling of Hybrid Frameworks", Science 315, 1828, 2007 (5 pp.).

ELECTROLYTE MEMBRANE FOR ENERGY STORAGE DEVICE, ENERGY STORAGE DEVICE INCLUDING THE SAME, AND METHOD OF PREPARING ELECTROLYTE MEMBRANE FOR ENERGY STORAGE DEVICE

CROSS-REFERENCE TO RELATED APPLICATION

This application claims priority to and the benefit of Korean Patent Application No. 10-2015-0066251, filed on May 12, 2015, in the Korean Intellectual Property Office, the content of which is incorporated herein in its entirety by reference.

BACKGROUND

1. Field

The present disclosure relates to an electrolyte membrane for an energy storage device, an energy storage device including the electrolyte membrane, and a method of preparing the electrolyte membrane for an energy storage device.

2. Description of the Related Art

Energy storage devices, such as lithium batteries or supercapacitors, are rechargeable devices, which are applicable in a wide range of fields, including portable electronic devices, such as mobile phones and MP3 players, and electric vehicles, such as hybrid electric vehicle, and plug-in hybrid electric vehicles.

Lithium batteries or supercapacitors may be classified depending on the variety and classification of the electrolyte thereof. For example, lithium batteries using liquid electrolytes are called lithium ion batteries, and lithium batteries that use polymer electrolytes are called lithium polymer batteries.

With the recent rapid market growth of high-performance mobile electronic devices and long-distance electric vehicles, the need for high-performance storage devices with high energy density and high power is increasing.

In order to provide such high energy density and output density, a lithium metal is used as a negative electrode. However, due to safety issues with lithium ion batteries using a lithium metal as a negative electrode, a risk of fire or explosion by thermal runaway is caused by an organic solvent in the liquid electrolyte thereof.

Thus, there is an increasing need for a polymer electrolyte not using a liquid electrolyte and an energy storage device including the polymer electrolyte.

SUMMARY

Provided is an electrolyte membrane for energy storage device.

Provided is an energy storage device using the electrolyte membrane.

Provided is method of manufacturing the electrolyte membrane for energy storage devices.

Additional aspects will be set forth in part in the description which follows and, in part, will be apparent from the description, or may be learned by practice of the presented exemplary embodiments.

According to one or more exemplary embodiments, an electrolyte membrane for an energy storage device includes:
a matrix including a first ionically conductive polymer;
an alkali metal salt, an alkaline earth metal salt, or a combination thereof;
a metal-organic framework; and
a second ionically conductive polymer miscible with the first ionically conductive polymer, and covalently bonded to a portion of or an entire surface of the metal-organic framework through at least one amide covalent bond.

According to an aspect of an exemplary embodiment, an energy storage device includes:
a positive electrode;
a negative electrode; and
the electrolyte membrane disposed between the positive electrode and the negative electrode.

According to an aspect of another exemplary embodiment, a method of preparing an electrolyte membrane for an energy storage device includes:
contacting (i) a matrix comprising a first ionically conductive polymer, (ii) an alkali metal salt, an alkaline earth metal salt, or a combination thereof, and (iii) a solvent to obtain a composition;
contacting (i) a metal-organic framework precursor, (ii) a second ionically conductive polymer miscible with the first ionically conductive polymer, and (iii) a catalyst to form a metal-organic framework, wherein the second ionically conductive polymer is bound to a surface of the metal-organic framework through at least one amide covalent bond; and
coating a member with a combination of the composition and the metal-organic framework to form the electrolyte membrane.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
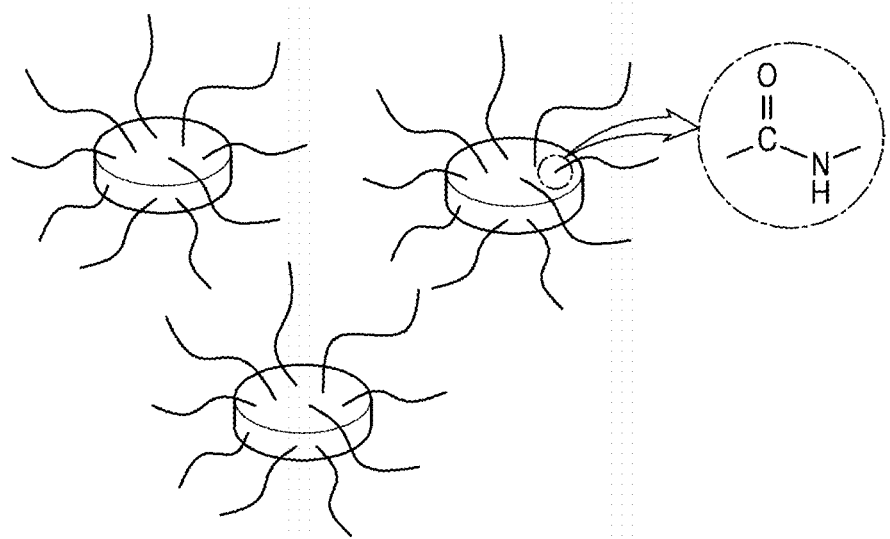
FIG. 1A is a schematic drawing of a metal-organic framework (MOF), in which polyethylene glycol (PEG) is covalently bound through an amide covalent bond to a surface of the MOF, according to an embodiment.
Figure 1B:
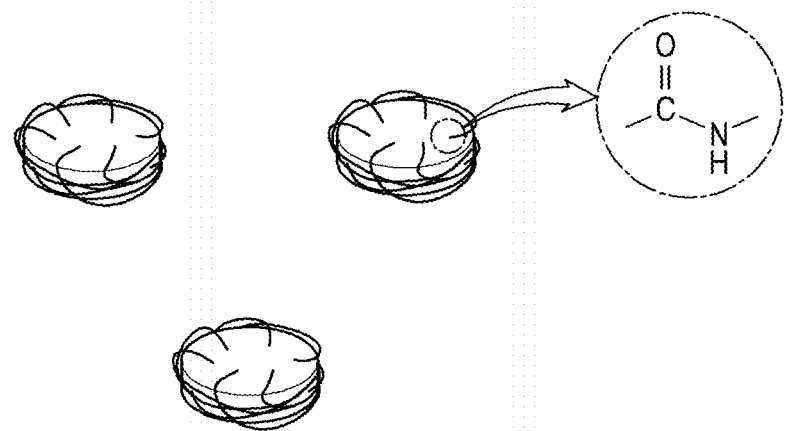
FIG. 1B is a schematic drawing of an MOF, in which PEG is covalently bound through an amide covalent bond to a surface of the MOF, according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Reference will now be made in detail to embodiments of an electrolyte membrane for an energy storage device, an energy storage device including the electrolyte membrane, and a method of preparing the electrolyte membrane. However, these are for illustrative purposes only and are not intended to limit the scope of the inventive concept. The scope of the inventive concept is indicated by the claims rather than by the detailed description.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment of the inventive concept, an electrolyte membrane for an energy storage device may include:

a matrix including a first ionically conductive polymer;

an alkali metal salt, an alkaline earth metal salt, or a combination thereof;

a metal-organic framework (MOF), wherein a portion of or the entire surface of the MOF may be bound to an ionically conductive polymer miscible with an ionically conductive polymer included in the matrix through at least one amide covalent bond (—C(=O)—NH—).

An example of the matrix including the first ionically conductive polymer is polyethylene oxide (PEO), which has an excellent electrochemical ability at a high temperature of about 60° C. or more. However, PEO has an ion conductivity of about $10^{-6}$ Siemens per centimeter (S/cm) or less at room temperature, which makes it difficult to be used in an energy storage device.

Due to the high crystallinity of the matrix including the first ionically conductive polymer at room temperature, migration of ions is limited. In addition, although to the less extent than a liquid electrolyte, the matrix including the first ionically conductive polymer may grow lithium dendrites, which may cause a problem in an energy storage device including the matrix.

In order to resolve such a problem, a plurality of inorganic nanoparticles, such as $SiO_2$ and $TiO_2$ may be added to the matrix including the first ionically conductive polymer. An electrolyte membrane including the inorganic nanoparticles may suppress crystallization of the matrix, and thus the electrolyte membrane may have improved ion conductivity and mechanical properties.

However, inorganic nanoparticles, such as $SiO_2$ and $TiO_2$ have very small size, and thus, very high surface energy. Further, agglomeration of the particles may occur, which may lead to decrease in surface energy. As a result, mechanical properties of the electrolyte membrane may decline, and thus, reduction of crystallinity may not be effective, and the electrochemical ability may be reduced.

When a filler is added to the matrix, an MOF in the electrolyte membrane may also improve mechanical properties of the electrolyte membrane. This effect is similar to the effect caused by the inorganic particles such as $SiO_2$ and $TiO_2$.

A portion or the entire surface of the MOF may include a second ionically conductive polymer miscible with the first ionically conductive polymer included in the matrix. As used herein, the term "miscible" refers to a physical state when the first and second ionically conductive polymers are mutually soluble (or in other words, when the first and second ionically conductive polymers exist as one phase). It is further to be understood that the term "polymer" as used herein is inclusive of oligomers, i.e., lower molecular weight entities having more than two repeating units, In general, a —COOH functional group included in a surface of a MOF may be chemically bound to an amine functional group included in the second ionically conductive polymer miscible with the first ionically conductive polymer included in the matrix, thereby forming an amide covalent bond. However, the amide covalent bond is not limited thereto.

The electrolyte membrane for an energy storage device may prevent agglomeration of the MOF and increase in a degree of dispersion in the electrolyte membrane. The increase in the degree of dispersion may decrease crystallinity, improving ion conductivity of the electrolyte membrane, achieving excellent electrochemical stability.

The second ionically conductive polymer miscible with an ionically conductive polymer included in the matrix may form at least one amide covalent bond with a portion of or the entire surface of the MOF. Thus, even upon exposure to an acid, the MOF may be very stable chemically and mechanically, compared to the ionically conductive polymer forming an ester covalent bond or an ether covalent bond. In addition, an energy storage device, which includes an electrolyte membrane, in which the second ionically conductive polymer miscible with the first ionically conductive polymer included in the matrix is bound to a surface of MOF by at least one amide covalent bond, may be less likely to cause problems, e.g., a short, since the amide covalent bond may not be easily broken by by-products, e.g., moisture generated upon charging and discharging of the battery.

The second ionically conductive polymer may be a polymer. For example, the second ionically conductive polymer miscible with a first ionically conductive polymer included in the matrix may include at least one of poly(ethylene oxide) (PEO), poly(propylene oxide) (PPO), poly(butylene oxide) (PBO), poly(oxyethylene) methacrylate (POEM), polyvinyl alcohol (PVA), polyacrylonitrile (PAN), polyimide (PI), polyvinyl chloride (PVC), polyacrylic acid (PAA), poly(ethylene glycol) (PEG), poly(ethylene glycol) diacrylate (PEGDA), poly(propylene glycol) diacrylate (PPGDA), poly(ethylene glycol) dimethacrylate (PEGDMA), poly(propylene glycol) dimethacrylate (PPGDMA), poly(ethylene glycol) urethane diacrylate, poly(ethylene glycol) urethane dimethacrylate, polyester diacrylate, polyester dimethacrylate, poly(ethylene glycol) urethane triacrylate, poly(ethylene glycol) urethane trimethacrylate, a polymer including a reaction product of trimethylolpropane triacrylate, trimethylolpropane trimethacrylate, trimethylolpropane triacrylate substituted with an ethoxy group, trimethylolpropane triacrylate substituted with a propoxy group, glyceryl triacrylate, glyceryl trimethacrylate, tetramethylolpropane tetraacrylate, di(trimethylolpropane) tetraacrylate, a combination thereof, or a copolymer thereof.

For example, the second ionically conductive polymer miscible with the first ionically conductive polymer included in the matrix may include poly(ethylene oxide) (PEO), poly(propylene oxide) (PPO), poly(butylene oxide) (PBO), poly(oxyethylene) methacrylate (POEM), polyvinyl alcohol (PVA), polyacrylonitrile (PAN), polyimide (PI), polyvinylchloride (PVC), and polyacrylic acid (PAA), poly(ethylene glycol) (PEG), a combination thereof, or a copolymer thereof.

The second ionically conductive polymer miscible with the first ionically conductive polymer included in the matrix may include a structure unit represented by Formula 1:

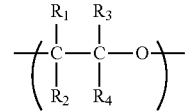

Formula 1 wherein, in Formula 1, $R_1$, $R_2$, $R_3$, and $R_4$ may be each independently a hydrogen, a hydroxy group, —C(=O)$R_a$, —C(=O)O$R_a$, —OCO (O$R_a$), a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_3$-$C_{30}$ cycloalkyl group, a substituted or unsubstituted $C_6$-$C_{30}$ aryl group, a substituted or unsubstituted $C_6$-$C_{30}$ aryloxy group, a substituted or unsubstituted $C_6$-$C_{30}$ heteroaryl group, or a combination thereof, wherein $R_a$ may be selected from a hydrogen, a $C_1$-$C_{10}$ alkyl group and a $C_6$-$C_{20}$ aryl group, or a combination thereof; and an average molecular weight of the second ionically conductive polymer miscible with the first ionically conductive polymer included in the matrix may be in a range of about 100 Daltons to about 50,000 Daltons. In some embodiments, an average molecular weight of the second ionically conductive polymer miscible with the first ionically conductive polymer included in the matrix may be in a range of about 500 Daltons to about 20,000 Daltons. In some embodiments, an average molecular weight of the second ionically conductive polymer miscible with the first ionically conductive polymer included in the matrix may be in a range of about 750 Daltons to about 10,000 Daltons.

When the average molecular weight of the second ionically conductive polymer miscible with the first ionically conductive polymer included in the matrix is greater than the highest number of these ranges, the chain length of the second ionically conductive polymer may become longer, the second ionically conductive polymer may agglomerate with each other and not dissolve in a solvent, causing difficulty in the manufacture and handling of the chains. Further, when the average molecular weight of the second ionically conductive polymer miscible with the first ionically conductive polymer included in the matrix is less than the lowest number of these ranges, the second ionically conductive polymer miscible with the first ionically conductive polymer may be in a form of a dimer, having a small degree of dispersion, thereby reducing interaction with the matrix including an ionically conductive polymer.

The second ionically conductive polymer miscible with the first ionically conductive polymer included in the matrix may have various geometrical shapes including a linear shape, a branched shape, a star shape, or a comb shape. Although not limited thereto, for example, the second ionically conductive polymer miscible with the first ionically conductive polymer included in the matrix may be a linear polymer.

The MOF may be a porous crystalline compound.

The MOF may be a porous crystalline compound, in which the chemical bonds are formed between a metal ion or a metal ion cluster and an organic ligand. The average pore diameter may be in a range of about 1 nanometer (nm) to about 10 nm. The average pore diameter may be, for example, in a range of about 1 nm to about 8 nm.

The metal ion constituting the MOF is advantageous for forming a coordination bond or a covalent bond, and the metal ion itself may be electrically stable so that the metal ion may not be involved in oxidation or reduction while charging and discharging an energy storage device. The metal ion may be, for example, a transition metal ion.

In some embodiments, the metal ion may include $Ti^{3+}$, $Ti^{4+}$, $Fe^{2+}$, $Fe^{3+}$, $V^{4+}$, $V^{3+}$, $V^{2+}$, $Y^{3+}$, $Zr^{4+}$, $Cu^{2+}$, $Al^{3+}$, $Si^{4+}$, $Si^{2+}$, $Cr^{3+}$, $Ga^{3+}$, $Mg^{2+}$, $Zn^{2+}$, $Zn^{+3}$, $Mn^{2+}$, $Mn^{3+}$, $Mn^{4+}$, or a combination thereof. In some embodiments, the metal ion may include $Ti^{3+}$, $Ti^{4+}$, $Zr^{4+}$, $Al^{3+}$, $Si^{4+}$, $Si^{2+}$, $Zn^{2+}$, $Zn^{+3}$, or a combination thereof. In some embodiments, the metal ion may include $Ti^{3+}$, $Ti^{4+}$, $Zr^{4+}$, $Al^{3+}$, $Zn^{2+}$, $Zn^{+3}$, or a combination thereof. The metal ion may include an oxo-centered metal cluster ion including the metal ion.

The organic ligand may have a group that may form a coordination bond, an ion bond, a covalent bond, or a combination thereof. For example, the organic ligand may be an organic compound having two or more positions that may form a coordination bond, an ion bond, a covalent bond, or a combination thereof, such as a bidentate or a tridentate, in order to form a stable MOF.

The organic ligand may include an aromatic dicarboxylic acid, an aromatic tricarboxylic acid, an imidazole compound, a tetrazole compound, a triazole compound, a pyrazole compound, an aromatic sulfonic acid, an aromatic phosphoric acid, an aromatic sulfinic acid, an aromatic phosphinic acid, a non-pyridine compound, or a combination thereof.

The organic ligand may include, for example, an aromatic dicarboxylic acid, an aromatic tricarboxylic acid, an imidazole compound, or a combination thereof.

Examples of the aromatic dicarboxylic acid or tricarboxylic acid may include a benzene dicarboxylic acid, such as a benzene-1,2-dicarboxylic acid (or an o-phthalic acid), a benzene-1,3-dicarboxylic acid (or an m-phthalic acid), and a benzene-1,4-dicarboxylic acid (or a ρ-phthalic acid); a benzene tricarboxylic acid, such as a benzene-1,3,5-tricarboxylic acid (or a trimesic acid); a naphthalene dicarboxylic acid; a biphenyl dicarboxylic acid; and a triphenyl dicarboxylic acid. Alternatively, the aromatic dicarboxylic acid or tricarboxylic acid may include compounds represented by Formulae 2 to 6.

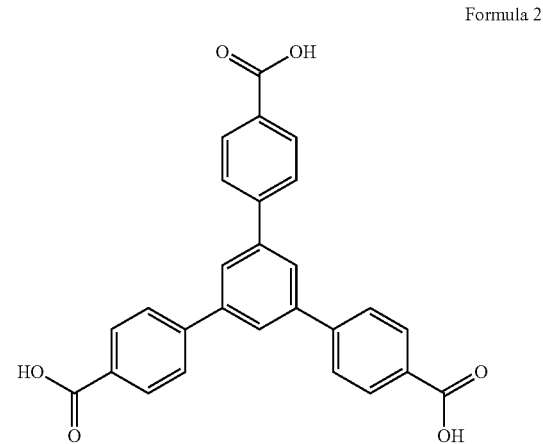

Formula 2

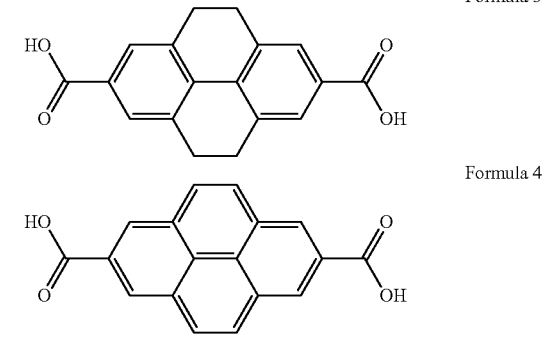

Formula 3

Formula 4

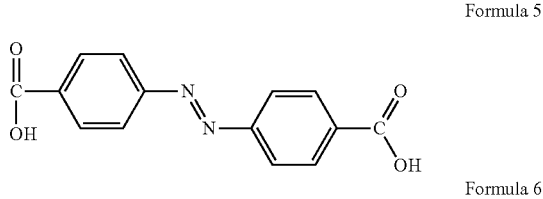

Formula 5

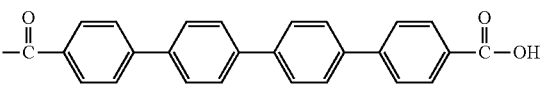

Formula 6

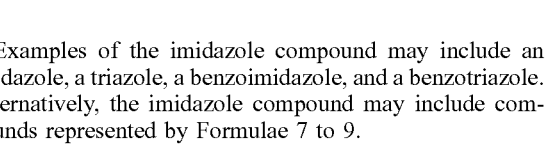

Examples of the imidazole compound may include an imidazole, a triazole, a benzoimidazole, and a benzotriazole. Alternatively, the imidazole compound may include compounds represented by Formulae 7 to 9.

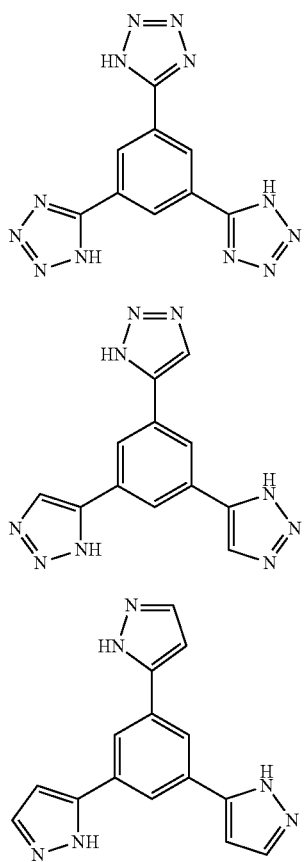

Formula 7

Formula 8

Formula 9

The MOF may include an MOF wound with a chain of a third ionically conductive polymer miscible with the first ionically conductive polymer included in the matrix on a surface of the MOF. In order to reduce surface energy, the MOF may be wound with a chain of the third ionically conductive polymer capable of interacting with the first ionically conductive polymer included in the matrix. The third ionically conductive polymer may the same type of polymer as the second ionically conductive polymer.

The ratio of a total size of the MOF to a size of an MOF that is bound to the second ionically conductive polymer miscible with the first ionically conductive polymer included in the matrix through at least one amide covalent bond may be in a range of about 1.0 to about 2.0.

The total size of the MOF and the size of MOF that is bound to the second ionically conductive polymer miscible with the first ionically conductive polymer included in the matrix through an amide covalent bond may be similar to each other. MOF that is bound to the second ionically conductive polymer capable of interacting with the first ionically conductive polymer included in the matrix may have no difference in the dispersibility due to the size difference with the MOF.

The total size of the MOF may be in a range of about 1 nm to about 1 micrometer (µm), a specific surface area thereof may be about 100 square meters per gram ($m^2/g$) or greater, and an average pore diameter thereof may be in a range of about 0.1 nm to about 10 nm.

The specific surface area of the MOF may be about 100 $m^2/g$ or greater. In some embodiments, the specific surface area of the MOF may be 500 $m^2/g$ or greater. In some embodiments, the specific surface area of the MOF may be 1,000 $m^2/g$ or greater. Due to the large specific surface area of the MOF as described above, ion conductivity may improve at room temperature.

The average pore diameter may be, for example, in a range of about 1 nm to about 5 nm. For example, the MOF may have a mesoporous structure.

The amount of the MOF may be in a range of about 0.1 to 50 percent (%) by weight, based on the total weight of the electrolyte membrane for an energy storage device. In some embodiment, the amount of the MOF may be in a range of about 0.1% to 40% by weight, based on the total weight of the electrolyte membrane for an energy storage device. In some embodiment, the amount of the MOF may be in a range of about 0.1% to 30% by weight, based on the total weight of the electrolyte membrane for an energy storage device.

The alkali metal salt and the alkaline earth metal salt may be $LiSCN$, $LiN(CN)_2$, $LiClO_4$, $LiBF_4$, $LiAsF_6$, $LiPF_6$, $LiCF_3SO_3$, $Li(CF_3SO_2)_2N$, $LiSbF_6$, $Li(CF_3SO_2)_3C$, $LiN(SO_2C_2F_5)_2$, $LiN(SO_2CF_3)_2$, $LiN(SO_2CF_2CF_3)_2$, $LiN(CF_3SO_2)_2$, $LiPF_3(C_2F_5)_3$, $LiPF_3(C_2F_5)_3$, $LiPF_3(CF_3)_3$, $LiB(C_2O_4)_2$, $NaSCN$, $NaSO_3CF_3$, $KTFSI$, $NaTFSI$, $Ba(TFSI)_2$, $Pb(TFSI)_2$, $Ca(TFSI)_2$, or $LiPF_3(CF_2CF_3)_3$. The alkali metal salt and the alkaline earth metal salt may be, for example, $LiSCN$, $LiN(CN)_2$, $LiClO_4$, $LiBF_4$, $LiAsF_6$, $LiPF_6$, $LiCF_3SO_3$, $Li(CF_3SO_2)_2N$, $LiSbF_6$, $Li(CF_3SO_2)_3C$, $LiN(SO_2C_2F_5)_2$, $LiN(SO_2CF_3)_2$, $LiN(SO_2CF_2CF_3)_2$, $LiN(CF_3SO_2)_2$, $LiPF_3(CF_2CF_3)_3$, $LiPF_3(C_2F_5)_3$, $LiPF_3(CF_3)_3$, $LiB(C_2O_4)_2$, or $LiPF_3(CF_2CF_3)_3$.

The first ionically conductive polymer included in the matrix may be a homopolymer or a block copolymer.

The homopolymer be an ionically conductive polymer, which is identical to the second ionically conductive polymer miscible with the first ionically conductive polymer included in the matrix.

The block copolymer may include poly(ethylene oxide)-b-poly(propylene oxide)(PEO-b-PPO), poly(ethylene oxide)-b-poly(propylene oxide)-b-poly(ethylene oxide) (PEO-b-PPO-b-PEO), poly(ethylene oxide)-b-poly(methyl methacrylate)(PEO-b-PMMA), poly(methyl methacrylate)-b-poly(ethylene oxide)-b-poly(methyl methacrylate) (PMMA-b-PEO-b-PMMA), poly(ethylene oxide)-b-poly(styrene)(PEO-b-PS), poly(styrene)-b-poly(ethylene oxide)-b-poly(styrene)(PS-b-PEO-b-PS), or a combination thereof.

The block copolymer may include a diblock copolymer or a triblock copolymer. For example, the block copolymer may include a linear block copolymer or a branched block copolymer. The block copolymer may have any of a variety of shapes, including a lamellar shape, a cylindrical shape, or a gyroid shape. The branched block copolymer may include any of a variety of forms of polymer, including a graft polymer, a star-shaped polymer, a comb polymer, a brush polymer, or a polymer network, but embodiments are not limited thereto, and may be any suitable polymer available as a branched copolymer in the art.

The homopolymer or block copolymer may have a weight average molecular weight (Mw) of about 100,000 Daltons to about 5,000,000 Daltons. In some embodiments, the homopolymer or block copolymer may have a weight average molecular weight (Mw) of about 100,000 Daltons to about 4,000,000 Daltons. In some embodiments, the homopolymer or block copolymer may have a weight average molecular weight (Mw) of about 100,000 Daltons to about 3,000,000 Daltons.

The matrix including the first ionically conductive polymer may be formed by, for example, thermal polymerization or by irradiation with active rays such as ultraviolet (UV) rays.

The electrolyte membrane for an energy storage device may further include an ionic liquid, a plurality of inorganic particles, or a combination thereof.

The term "ionic liquid" refers to a salt in a liquid state at room temperature or a room temperature molten salt having a melting point of room temperature or less and consisting of ions. The ionic liquid may include at least one cation selected from a pyrrolidinium cation, a pyridinium cation, a piperidinium cation, an imidazolium cation, a piperidinium cation, and an ammonium cation and at least one anion selected from a bis(trifluoromethylsulfonyl) imide anion, a bromide anion, a chloride anion, a dicyanamide anion, a hexafluorophosphate anion, a phosphate anion, a sulfate anion, an iodide anion, a sulfonate anion, a nitrate anion, a tetrafluoroborate anion, a thiocyanate anion, and a triflate anion. The ionic liquid may further improve the ionic conductivity and electrochemical stability of the electrolyte membrane.

A mole ratio of the ionic liquid to lithium ions (IL/Li) may be in a range of about 0.1 to about 2.0. In some embodiments, a mole ratio of the ionic liquid to lithium ions (IL/Li) may be in a range of about 0.2 to about 1.8. In some embodiments, a mole ratio of the ionic liquid to lithium ions (IL/Li) may be in a range of about 0.4 to about 1.5. While not wishing to be bound by a theory, it is understood that when the mole ratio of the ionic liquid to lithium ions (IL/Li) is within these ranges, the ionic liquid may improve the ionic conductivity of the electrolyte membrane, and provide suitable mechanical properties for suppressing growth of a lithium dendrite on the surface of the anode.

The inorganic particles may include at least one selected from a metal oxide, a metal hydroxide, a metal carbonate, a metal carboxylate, a metal silicate, a metal aluminosilicate, a metal carbide, a metal nitride, a metal halide (for example, metal fluoride), a metal nitrate, a carbon oxide, a carbonaceous material, and an organic-inorganic complex, but it is not limited thereto, and any material available in the art that may improve an ion conductivity of an electrolyte and increase a mechanical strength of an electrolyte may be used. For example, the inorganic particles may be at least one selected from $Al_2O_3$, $SiO_2$, $BaTiO_3$, graphite oxide, graphene oxide, polyhedral oligomeric silsesquioxanes (POSS), $Li_2CO_3$, $Li_3PO_4$, $Li_3N$, $Li_3S_4$, $Li_2O$, and montmorillonite. The inorganic particles, for example, may include a known inorganic nanoparticles, such as $SiO_2$ or $TiO_2$.

The inorganic particles may have various shapes. For example, the inorganic particle may have a spherical shape, an elliptical shape, a cubical shape, a tetrahedral shape, a pyramidal shape, an octahedral shape, a cylindrical shape, a polygonal pillar-like shape, a conical shape, a columnar shape, a tubular shape, a helical shape, a funnel shape, a dendritic shape, or any of various common regular and irregular shapes.

According to another aspect of the present inventive concept, an energy storage device may include:
a positive electrode,
a negative electrode, and
an electrolyte membrane disposed between the positive electrode and the negative electrode. A separator may be further included between the positive electrode and the negative electrode.

The energy storage device may further include a liquid electrolyte, a solid electrolyte, a gel electrolyte, a polymer ionic liquid on the electrolyte membrane, or a combination thereof.

The liquid electrolyte may include an organic solvent such as ethylene carbonate, propylene carbonate, dimethyl carbonate, diethyl carbonate, ethylmethyl carbonate, fluoroethylene carbonate, γ-butyrolactone, 1,2-dimethoxy ethane, 1,2-diethoxy ethane, dimethylene glycol dimethyl ether, trimethylene glycol dimethyl ether, tetraethylene glycol dimethyl ether, polyethylene glycol dimethyl ether, succinonitrile, sulfolane, dimethyl sulfone, ethylmethyl sulfone, diethyl sulfone, adiponitrile, 1,1,2,2-tetrafluoroethyl 2,2,3,3-tetrafluoropropyl ether, and tetraphenylethene 2,2,2-trifluoroethanol, or a combination thereof.

The electrolyte membrane may be, for example, impregnated in the liquid electrolyte.

The energy storage device may include at least one selected from a liquid electrolyte, a gel electrolyte, an ionic liquid, a plurality of inorganic particles, a separator, and a combination thereof.

The energy storage device may be a secondary battery or a super capacitor.

For example, the energy storage device may be a lithium secondary battery.

The lithium secondary battery may be, for example, manufactured as follows.

First, the positive electrode may be manufactures as follows.

A positive electrode active material, a conducting agent, a binder, and a solvent may be mixed to prepare a positive electrode active material composition. The positive electrode active material composition may be directly coated on a current collector and dried to form a positive electrode active material layer thereon, thereby forming a positive electrode. Alternatively, the positive electrode active material composition may be casted on a separate support to form a positive electrode active material layer, which then may be separated from the support and laminated on a current collector to form a positive electrode active material layer thereon, thereby forming a positive electrode.

The positive electrode active material may be any suitable positive electrode materials which is available in the art, provided that it allows for intercalation and deintercalation of lithium ions. Although examples of the positive electrode active material that allows for intercalation and deintercalation of lithium ions are not particularly limited, examples thereof include compounds represented by the following formulae: $Li_aA_{1-b}B'_bD'_2$ (wherein $0.90 \leq a \leq 1.8$, and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$, and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $LiQO_2$; $LiQS_2$; $LiV_2O_5$;

LiI'O$_2$; LiNiVO$_4$; Li$_{(3-f)}$J$_2$(PO$_4$)$_3$ (wherein 0≤f≤2); Li$_{(3-f)}$Fe$_2$(PO$_4$)$_3$ wherein (0≤f≤2); and LiFePO$_4$.

In the formulae above, A may be at least one selected from nickel (Ni), cobalt (Co), and manganese (Mn); B' may be at least one selected from aluminum (Al), nickel (Ni), cobalt (Co), manganese (Mn), chromium (Cr), iron (Fe), magnesium (Mg), strontium (Sr), vanadium (V), and an alkali rare earth element; D' may be at least one selected from oxygen (O), fluorine (F), sulfur (S), and phosphorus (P); E may be at least one selected from cobalt (Co), and manganese (Mn); G may be at least one selected from aluminum (Al), chromium (Cr), manganese (Mn), iron (Fe), magnesium (Mg), lanthanum (La), cerium (Ce), strontium (Sr), and vanadium (V); Q may be at least one selected from titanium (Ti), molybdenum (Mo), and manganese (Mn); I' may be at least one selected from chromium (Cr), vanadium (V), iron (Fe), scandium (Sc), and yttrium (Y); and J may be at least one selected from vanadium (V), chromium (Cr), manganese (Mn), cobalt (Co), nickel (Ni), and copper (Cu).

Non-limiting examples of the conducting agent include carbon black, graphite particulates, natural graphite, artificial graphite, acetylene black, Ketjen black, carbon fibers, metallic materials, such as copper, nickel, aluminum, silver, and the like, in powder, fiber, or tube form, and a conductive polymer such as a polyphenylene derivative. Any suitable conducting agent available in the art may be used.

Non-limiting examples of the binder include a vinylidene fluoride/hexafluoropropylene copolymer, polyvinylidene difluoride (PVDF), polyacrylonitrile, polymethylmethacrylate, polytetrafluoroethylene (PTFE), combinations of these polymers, or a styrene butadiene rubber polymer.

Example of the binder include a polysaccharide or a derivative thereof, for example, starch, methyl cellulose, carboxymethyl cellulose, hydroxymethyl cellulose, hydroxyethyl cellulose, hydroxypropyl cellulose, carboxymethyl hydroxyethyl cellulose, or nitrocellulose; phenol resin; melamine resin; polyurethane resin; urea resin; polyamide resin; polyimide resin; polyamideimide resin; petroleum pitch; and coal pitch a combination thereof. A plurality of binders may be used as a binder. The binder may serve as a thickening agent in an electrode mixture.

Non-limiting examples of the solvent are N-methyl-pyrrolidone (NMP), acetone, and water. Any suitable material available as a solvent in the art may be used.

Examples of the current collector of the positive electrode may include a metal such as nickel, aluminum, titanium, copper, gold, silver, platinum, an aluminum alloy, or stainless steel, or may be formed by plasma spraying or arc spraying, for example, a carbonaceous material, activated carbon fiber, nickel, aluminum, zinc, copper, tin, lead, or an alloy thereof. The current collector may include a conductive film formed by dispersing a conductive agent in resin, such as a rubber or styrene-ethylene-butylene-styrene (SEBS) copolymer. For example, the current collector may include aluminum, nickel, or stainless steel. The current collector may be formed of aluminum that is easily processible into a thin film and costs low. The current collector may have any of a variety shapes, for example, a thin film shape, a flat-plate shape, a mesh shape, a net shape, a punched shape, an embossed shape, or a combination thereof (for example, a meshed flat-plate shape). For example, the current collector may have an uneven surface through etching.

The amounts of the positive electrode active material, the conducting agent, the binder, and the solvent used in the manufacture of the lithium battery are amounts are generally used in the art. At least one of the conducting agent, the binder, and the solvent may not be used depending on the use and the structure of the lithium secondary battery. Alternatively, a plasticizer may be further added to the positive electrode active material composition to form a positive electrode plate including pores.

A negative electrode of the lithium battery may be manufactured in the same manner as in the manufacturing of the positive electrode, except for using a negative electrode active material, instead of the positive electrode active material.

For example, the negative electrode may be manufactures as follows.

Similarly to the manufacturing of the positive electrode as described above, a negative electrode active material, a conducting agent, a binder, and a solvent may be mixed together to prepare a negative electrode active material composition. The negative electrode active material composition may be directly coated on a current collector to form a negative electrode. In some embodiments, the negative electrode active material composition may be cast on a separate support to form a negative electrode active material film, which then may be separated from the support and laminated on a current collector to form a negative electrode.

Examples of the negative electrode may include a lithium metal and a lithium metal alloy electrode.

For example, the lithium metal alloy electrode may be Na, K, Rb, Cs, Fr, Be, Mg, Ca, Sr, Ba, Ra, Al, Sn, or a combination thereof.

The thickness of the negative electrode including the lithium metal or the lithium metal alloy may be in a range of about 50 nm to about 100 μm, in some embodiments, about 100 nm to about 1 μm, and in some embodiments, about 200 nm to about 500 nm. For example, the negative electrode may have a thickness of less than 500 nm, in some embodiments, less than 200 nm, in some other embodiments, less than 100 nm, and in some other embodiments, less than 50 nm.

However, the negative electrode is not limited thereto, and may be any suitable negative electrode that is commonly used in the art.

The current collector of the negative electrode may be any suitable current collector, not limited to a material, shape, or manufacturing method thereof. For example, the current collector of the negative electrode may be a copper foil having a thickness of about 10 μm to about 100 μm, a punched copper foil having a thickness of about 10 μm to about 100 μm and a hole diameter of about 0.1 mm to about 10 mm, expandable metal, or a foamed metal plate. The current collector of the negative electrode may be formed of copper, stainless steel, titanium, or nickel.

The conducting agent, the binder, and the solvent in the negative electrode active material composition may be the same as those used in the positive electrode active material composition. If desired, a plasticizer may further be added to the positive active material composition and the negative active material composition to form pores inside the electrode plates.

The amounts of the negative electrode active material, the conducting agent, the binder, and the solvent used in the manufacture of the lithium battery may be amounts that are generally used in the art. At least one of the conducting agent, the binder, and the solvent may not be used depending on the use and the structure of the lithium secondary battery.

Next, an electrolyte is prepared.

The electrolyte may include the electrolyte membrane. If desired, the electrolyte membrane may be formed on a portion of or the entire surface of the negative electrode or further included as a protective layer separately disposed between the negative electrode and the electrolyte membrane. The electrolyte membrane may have a monolayered structure or a multilayered structure including at least two layers.

The energy storage device may include a liquid electrolyte, a gel electrolyte, an ionic liquid, a plurality of inorganic particles, a separator, or a combination thereof.

In some embodiments, a separator (not shown) may be included in the positive electrode and the negative electrode. The separator may be any suitable separator that is commonly used in a lithium secondary battery. The separator may have low resistance to migration of ions in an electrolyte and have electrolytic solution-retaining ability. Examples of the separator include glass fiber, polyester, Teflon, polyethylene, polypropylene, polytetrafluoroethylene (PTFE), and a combination thereof, each of which may be a non-woven fabric or a woven fabric. For example, a windable separator including polyethylene or polypropylene may be used for a lithium ion battery. A separator with excellent ability to retain an electrolyte, for example, an organic electrolyte, may be used for a lithium ion polymer battery.

For example, the separator may be manufactured in the following manner.

A polymer resin, a filler, and a solvent may be mixed together to prepare a separator composition. Then, the separator composition may be directly coated on a negative electrode, and then dried to form the separator. Alternatively, the separator composition may be cast on a support and then dried to form a separator film, which may then be separated from the support and laminated on the negative electrode to form the separator.

The polymer resin used for manufacturing the separator may be any suitable material that is generally used as a binder for electrodes. Examples of the polymer resin include a vinylidenefluoride/hexafluoropropylene copolymer, polyvinylidene fluoride (PVDF), polyacrylonitrile, polymethylmethacrylate and a combination thereof.

Figure 10A:
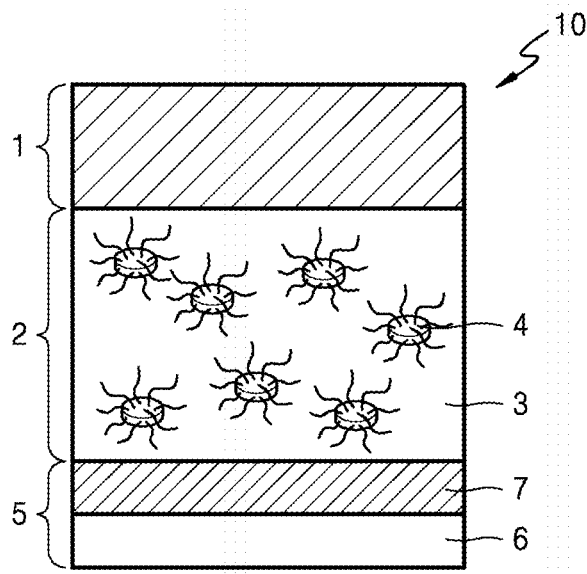
FIGS. 10A and 10B are schematic drawings of a lithium secondary battery according to an embodiment of the inventive concept.
Figure 10B:
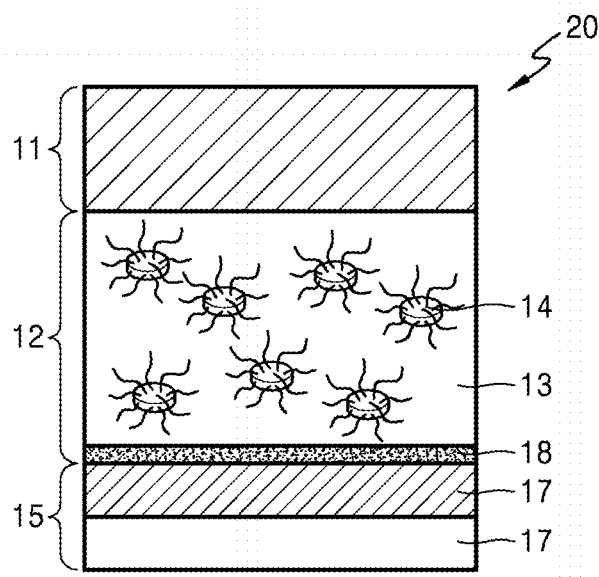

FIGS. 10A and 10B are schematic drawings of a lithium secondary battery according to an embodiment of the present inventive concept. Referring to FIGS. 10A and 10B, a lithium secondary battery 10 and 20 may include a matrix 3 and 13 including an ionically conductive polymer between a negative electrode 1 and 11 and a positive electrode 5 and 15 including a positive electrode active material 7 and 17 on a current collector 6 and 16, an MOF 4 and 14, and an electrolyte membrane 2 and 12 including a lithium salt (not shown). The electrolyte membrane 2 and 12 may further include a liquid electrolyte, a solid electrolyte, a gel electrolyte, a polymer ionic liquid, or a combination thereof, thereon.

The MOF 4 and 14 may be bound to the second ionically conductive polymer miscible with the first ionically conductive polymer included in the matrix 3 and 13 including the second ionically conductive polymer bound through at least one amide covalent bond to a surface of the MOF 4 and 14.

Lithium batteries may be a cylindrical type, a rectangular type, a coin type, or a pouch type according to the shape thereof. Lithium batteries may also be classified as either bulk type or thin film type according to the size thereof.

The energy storage device may also be used in a lithium primary battery. Methods of manufacturing these lithium batteries are widely known in the art, so a detailed description thereof will not be recited here.

According to another aspect of the present inventive concept, a method of manufacturing an electrolyte membrane for an energy storage device may include:

contacting (i) a matrix comprising a first ionically conductive polymer, (ii) an alkali metal salt, an alkaline earth metal salt, or a combination thereof, and (iii) a solvent to obtain a composition;

contacting (i) a metal-organic framework precursor, (ii) a second ionically conductive polymer miscible with the first ionically conductive polymer, and (iii) a catalyst to form a metal-organic framework, wherein the second ionically conductive polymer is bound to a surface of the first ionically conductive polymer included in a matrix through at least one amide covalent bond; and coating a member with a combination of the composition and the metal-organic framework to form the electrolyte membrane.

First, an MOF may be prepared. The MOF may prepared by performing a hydrothermal synthesis method, a microwave synthesis method, an ultrasonic synthesis method, an electrochemical synthesis method, or a mechanical chemical synthesis method.

A mole ratio of a metal ion precursor to an organic ligand precursor included in the MOF may be properly controlled within a range of MOF of interest.

MOF is described in detail above, and thus, a detailed description will not be recited here.

Next, by contacting a catalyst, an MOF, wherein a surface of the MOF is bound to the second ionically conductive polymer miscible with the first ionically conductive polymer included in a matrix through at least one amide covalent bond, may be formed. In the present specification, the term "contact" may be used in a broad meaning including processes, such as adding, mixing, and stirring.

The second ionically conductive polymer miscible with the first ionically conductive polymer included in the matrix is described in detail above; so a detailed description will not be recited here.

The catalyst may include 1-ethyl-3-(3-dimethylamino propyl) carbodiimide (EDC), N-hydroxy succinimide (NHS), boronic acid, ruthenium, a 1,2,4-triazole derivative salt, or a combination of at least two of the foregoing.

Examples of the 1,2,4-triazole derivative salt may include compounds represented by Formulae 10 and 11.

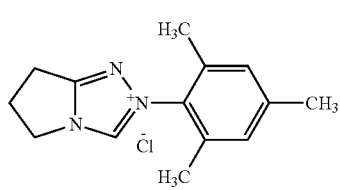

Formula 10

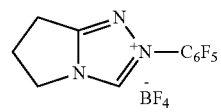

Formula 11

The catalyst may be 1-ethyl-3-(3-dimethylaminopropyl) carbodiimide (EDC) or N-hydroxysuccinimide (NHS).

The catalyst may cause an EDC/NHS coupling reaction, inducing the second ionically conductive polymer miscible with the first ionically conductive polymer covalently bound through at least one amide covalent bond to a surface of the MOF.

Figure 11:
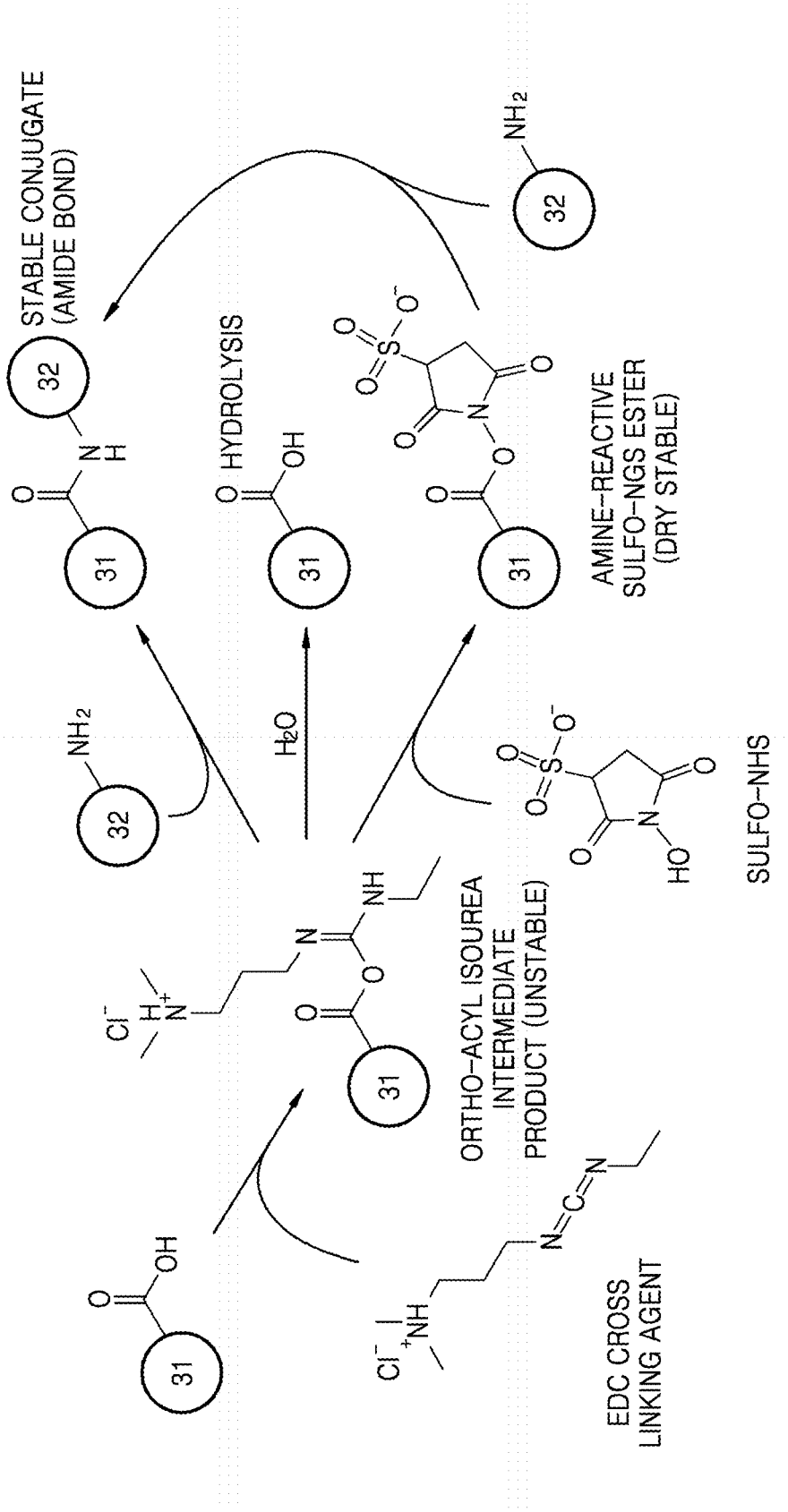
FIG. 11 illustrates a specific mechanism of a EDC/NHS coupling reaction according to an embodiment.

The specific mechanism of EDC/NHS coupling reaction is shown in Reaction Scheme 1 (also shown in FIG. 11).

Reaction Scheme 1

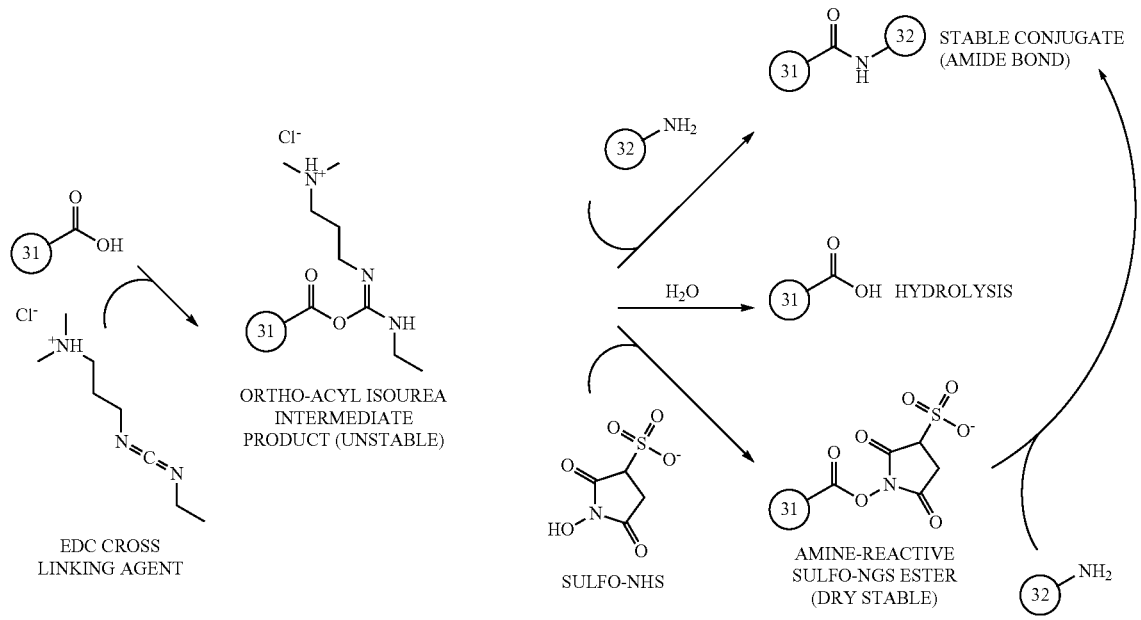

Then, by adding a matrix including the first ionically conductive polymer and an alkali metal salt, an alkaline earth metal salt, or a combination thereof to a solvent, a composition may be obtained. The composition may be a solution, for example, a homogenized colloidal solution.

Then, a member may be coated with a mixture of the composition and the MOF to form the electrolyte membrane.

The method of coating the member with the composition may be any suitable coating method that is used in the art, such as spin-coating, spray coating, doctor blade coating, or drop coating.

Hereinafter Examples and Comparative Examples will be described in detail. However, Examples are for illustrative purpose only, and are not intended to limit the scope of the inventive concept.

Hereinafter are definitions of substituents used in the chemical formulae.

The term "alkyl" as used herein a chemical formula refers to a group derived from a fully saturated branched or non-branched (or straight chain or linear) hydrocarbon group. Examples of the "alkyl" include methyl, ethyl, n-propyl, iso-propyl, n-butyl, iso-butyl, sec-butyl, n-pentyl, iso-pentyl, neo-pentyl, iso-amyl, n-hexyl, 3-methylhexyl, 2,2-dimethylpentyl, 2,3-dimethyl pentyl, and n-heptyl.

At least one hydrogen atom in the "alkyl" may be substituted with a halogen atom, a C1-C20 alkyl group (e.g.: $CCF_3$, $CHCF_2$, $CH_2F$, or $CCl_3$) substituted with a halogen atom, a hydroxyl group (—OH), a nitro group (—$NO_2$), a cyano group (—CN), an amino group (—$NH_2$), an amidino group (—C(=NH)$NH_2$), a hydrazine group (—$NHNH_2$), a hydrazone group (—C=N—$NH_2$), a carboxylic acid group (—$CO_2$H) or a salt thereof, a sulfonyl group (—$SO_2$H), a sulfamoyl group (—S(O)$_2NH_2$), a sulfonic acid group (—$SO_3$H) or a salt thereof, a phosphoric acid group (—P(O)(OH)$_2$) or a salt thereof, a C1-C20 alkyl group, C1-C20 alkoxy group, a C2-C20 alkenyl group, a C2-C20 alkynyl group, a C3-C30 cycloalkyl group, a C6-C20 aryl group, a C6-C20 aryloxy group, or a C6-C20 heteroaryl group. When a group containing a specified number of carbon atoms is substituted with any of the substituents listed above, the number of carbon atoms in the resulting "substituted" group is the number of atoms contained in the base group plus the number of carbon atoms (if any) contained in the substituent. For example, the "substituted C1-C30 alkyl" may refer to a C1-C30 alkyl group substituted with C6-20 aryl group, in which the total number of carbon atoms may be C7 to C50.

The term "alkoxy" as used herein a chemical formula refers to "alkyl-O—", wherein the term "alkyl" has the same meaning as described above. Examples of the alkoxy include methoxy, ethoxy, n-propoxy, iso-propoxy, n-butoxy, iso-butoxy, sec-butoxy, tert-butoxy, pentyloxy, and hexyloxy. In the alkoxy group, at least one hydrogen atom may be substituted with the same groups as described above in connection with the alkyl group.

The term "alkenyl" as used herein a chemical formula refers to a branched or non-branched hydrocarbon having at least one carbon-carbon double bond. Examples of the alkenyl group include vinyl, allyl, butenyl, iso-propenyl, and iso-butenyl. At least one hydrogen atom of the alkenyl group may be substituted with the same groups as described above in connection with the alkyl group.

The term "alkynyl" as used herein a chemical formula refers to a branched or non-branched hydrocarbon having at least one carbon-carbon triple bond. Examples of the alkynyl group include ethynyl, butynyl, iso-butynyl, and iso-propynyl. At least one hydrogen atom of the alkynyl group may be substituted with the same groups as described above in connection with the alkyl group.

The term "cycloalkyl" as used herein a chemical formula refers to a saturated or partially unsaturated non-aromatic monocyclic, bicyclic, or tricyclic hydrocarbon group. Examples of the monocyclic hydrocarbon group include cyclopentyl, cyclopentenyl, cyclohexyl, and cyclohexenyl. Examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl. Examples of the tricyclic hydrocarbon include adamantyl.

At least one hydrogen atom in the "cycloalkyl" may be substituted with the same groups as described above in connection with the alkyl group.

The term "aryl" as used herein a chemical formula refers to an aromatic hydrocarbon that may be used alone or in a combination and includes at least one ring. The term "aryl" includes a group, wherein an aromatic ring is fused with one or more cycloalkyl rings. Examples of the aryl may be phenyl, naphthyl, and tetrahydronaphthyl. Also, at least one hydrogen atom in the aryl group may be substituted with the same groups as described above in connection with the alkyl group.

The term "aryloxy" as used herein a chemical formula refers to O-aryl, and examples of the aryloxy group include phenoxy. At least one hydrogen atom in the aryl group may be substituted with the same groups as described above in connection with the alkyl group. At least one hydrogen atom in the aryloxy group may be substituted with the same groups as described above in connection with the alkyl group.

The term "heteroaryl" as used herein a chemical formula refers to a monocyclic or bicyclic organic compound including at least one heteroatom selected from nitrogen (N), oxygen (O), phosphorus (P), and sulfur (S), and the remaining ring atoms are carbon (C). For example, the heteroaryl group may include 1 to 5 heteroatoms and may include 5 to 10 ring members, wherein S or N may be present in various oxidation states. Examples of heteroaryl group include pyridyl, pyrrolyl, pyrimidinyl, and imidazolyl. At least one hydrogen atom in the heteroaryl group may be substituted with the same groups as described above in connection with the alkyl group.

EXAMPLE

Preparation Example 1: Preparation of MOF (MIL-125($Ti_8O_8(OH)_4(BDC)_6$), BDC=1,4-Benzenedicarboxylate) a Surface of which is Covalently Bound to Polyethylene Glycol ($PEG_{750}$) Through an Amide Covalent Bond Titanium isopropoxide (99.8%, available from Aldrich Co., Ltd.) and 1,4-benzene dicarboxylic acid ($H_2BDC$, 99%, available from Aldrich Co., Ltd.) were mixed with 50 milliliters (mL) of N,N-dimethylformamide (DMF, available from Aldrich Co., Ltd.) and methanol (9:1, volume to volume (v/v)) to obtain a mixture. The amounts of titanium isopropoxide and 1,4-benzene dicarboxylic acid in the mixture were stoichiometric in order to obtain an MOF $Ti_8O_8(OH)_4(BDC)_6$. The total amount of the solvent mixture was adjusted to about 150 times higher than the amount of titanium isopropoxide.

The mixture was placed in a reactor and thermally treated at about 150° C. for about 24 hours. Afterwards, the thermally treated mixture was cooled down to room temperature, the remaining unreacted organic ligand was washed with N, N-dimethylformamide and then with methanol, each three times, and filtered to obtain a precipitate. The precipitate was dried in an oven at 60° C. under vacuum for about 24 hours, thereby preparing a MOF (MIL-125($Ti_8O_8(OH)_4(BDC)_6$).

The MOF (MIL-125($Ti_8O_8(OH)_4(BDC)_6$) and methoxypolyethylene glycol amine (Mw: 750, available from Aldrich Co., Ltd.) were dispersed in 10 mL of N, N-dimethyl form amide to obtain a dispersant. Ethyl(dimethylaminopropyl) carbodiimide (EDC) and N-hydroxysuccinimide (NHS) were added thereto and stirred at room temperature, thereby preparing a MOF (MIL-125($Ti_8O_8(OH)_4(BDC)_6$), BDC=1,4-benzenedicarboxylate) a surface of which was covalently bound to polyethylene glycol ($PEG_{750}$) through an amide covalent bond.

In the dispersion liquid, a mole ratio of the COOH group in the MOF (MIL-125($Ti_8O_8(OH)_4(BDC)_6$) to the $NH_2$ group in methoxypolyethylene glycol amine (Mw: 750, available from Aldrich Co., Ltd.) to EDC to NHS was about 1:2:40:40.

Preparation Example 2: Preparation of MOF (MIL-125($Ti_8O_8(OH)_4(BDC)_6$), BDC=1,4-Benzenedicarboxylate) a Surface of which is Covalently Bound to Polyethylene Glycol ($PEG_{2000}$) Through an Amide Covalent Bond An MOF (MIL-125($Ti_8O_8(OH)_4(BDC)_6$), BDC=1,4-benzenedicarboxylate), a surface of which was covalently bound to polyethylene glycol ($PEG_{2000}$) through an amide covalent bond, was prepared in the same manner as in Preparation Example 1, except that methoxypolyethylene glycol amine (Mw: 2,000, available from Aldrich Co., Ltd.) was used instead of methoxypolyethylene glycol amine (Mw: 750, available from Aldrich Co., Ltd.).

In a dispersion liquid prepared in the same manner as in Preparation Example 1, a mole ratio of the COOH group in the MOF (MIL-125($Ti_8O_8(OH)_4(BDC)_6$) to the $NH_2$ group in methoxypolyethylene glycol amine (Mw: 2,000, available from Aldrich Co., Ltd.) to EDC to NHS was about 1:2:40:40.

Preparation Example 3: Preparation of MOF (MIL-125($Ti_8O_8(OH)_4(BDC)_6$), BDC=1,4-Benzenedicarboxylate) a Surface of which is Covalently Bound to Polyethylene Glycol ($PEG_{100000}$) Through an Amide Covalent Bond An MOF (MIL-125($Ti_8O_8(OH)_4(BDC)_6$), BDC=1,4-benzenedicarboxylate), a surface of which was covalently bound to polyethylene glycol ($PEG_{10000}$) through an amide covalent bond, was prepared in the same manner as in Preparation Example 1, except that methoxypolyethylene glycol amine (Mw: 10,000, available from Aldrich Co., Ltd.) was used instead of methoxypolyethylene glycol amine (Mw: 750, available from Aldrich Co., Ltd.).

In a dispersion liquid prepared in the same manner as in Preparation Example 1, a mole ratio of the COOH group in the MOF (MIL-125($Ti_8O_8(OH)_4(BDC)_6$) to the $NH_2$ group in methoxypolyethylene glycol amine (Mw: 10,000, available from Aldrich Co., Ltd.) to EDC to NHS was about 1:2:40:40.

Comparative Preparation Example 1: Preparation of MOF (MIL-125($Ti_8O_8(OH)_4(BDC)_6$), BDC=1,4-Benzenedicarboxylate)

Titanium isopropoxide (99.8%, available from Aldrich Co., Ltd.) and 1,4-benzene dicarboxylic acid ($H_2BDC$, 99%, available from Aldrich Co., Ltd.) were mixed with 50 mL of N,N-dimethyl form amide (DMF, available from Aldrich Co., Ltd.) and methanol (9:1, v/v) to obtain a mixture. The amounts of titanium isopropoxide and 1,4-benzene dicarboxylic acid in the mixture were stoichiometric in order to obtain an MOF $Ti_8O_8(OH)_4(BDC)_6$. The total amount of the solvent mixture was adjusted to about 150 times higher than the amount of titanium isopropoxide.

The mixture was placed in a reactor and thermal-treated at about 150° C. for about 24 hours. Afterwards, the thermally treated mixture was cooled down to room temperature, the remaining unreacted organic ligand was washed with N,N-dimethylformamide and then with methanol, each three times, and filtered to obtain a precipitate. The precipitate was dried in an oven at 60° C. under vacuum for about 24 hours, thereby preparing a MOF (MIL-125($Ti_8O_8(OH)_4(BDC)_6$).

Comparative Preparation Example 2: Preparation of MOF (MIL-53(Al)(Al(OH)(BDC), BDC=1,4-Benzenedicarboxylate)

Aluminum nitrate nonahydrate (≥98%, available from Aldrich Co., Ltd.) and 1,4-benzene dicarboxylic acid ($H_2BDC$, 99%, available from Aldrich Co., Ltd.) were mixed with 50 mL of N,N-dimethyl form amide (DMF, available from Aldrich Co., Ltd.) and methanol (9:1, v/v) to obtain a mixture. The amounts of aluminum nitrate nonahydrate and 1,4-benzene dicarboxylic acid in the mixture were stoichiometric in order to obtain an MOF Al(OH)(BDC). The total amount of the solvent mixture was adjusted to about 30 times higher than the amount of aluminum nitrate nonahydrate.

The mixture was placed in a reactor and thermally treated at about 150° C. for about 24 hours. Afterwards, the thermally treated mixture was cooled down to room temperature, the remaining unreacted organic ligand was washed with N,N-dimethylformamide and then with methanol, each three times, and filtered to obtain a precipitate. The precipitate was dried in an oven at 120° C. under vacuum for about 24 hours, thereby preparing a MOF (MIL-53(Al)(Al(OH)(BDC)).

Example 1: Preparation of Electrolyte Membrane (PEO+MIL-125 ($Ti_8O_8(OH)_4(BDC)_6$ a Surface of which is Covalently Bound to $PEG_{750}$ Through an Amide Covalent Bond)

Polyethylene oxide (PEO, 99.9%, Mw=600 k, available from Aldrich Co., Ltd.) was dissolved in 5 percent by weight (wt %) of anhydrous tetrahydrofuran (THF, ≥99%, available from Aldrich Co., Ltd.). Lithium bis(trifluoromethanesulfonyl) imide ($LiN(SO_2CF_3)_2$, LiTFSI, available from PANAX Co., Ltd.) was added to the solution to obtain a composition. A mole ratio of ethylene oxide to lithium ions (EO/Li) in polyethylene oxide was about 16:1.

The MOF (MIL-125($Ti_8O_8(OH)_4(BDC)_6$), BDC=1,4-benzenedicarboxylate) a surface of which was covalently bound to polyethylene glycol ($PEG_{750}$) through an amide covalent bond, prepared in Preparation Example 1, was added to the composition and then stirred at a rate of 250 revolutions per minute (r/min) for about 12 hours under argon atmosphere to obtain a solution.

A teflon support substrate was coated with the solution by drop coating and then dried at 60° C. under vacuum for about 12 hours, thereby preparing an electrolyte membrane (thickness: about 50 micrometers (μm)).

The amount of the MOF (MIL-125($Ti_8O_8(OH)_4(BDC)_6$), BDC=1,4-benzenedicarboxylate) a surface of which was covalently bound to polyethylene glycol ($PEG_{750}$) through an amide covalent bond was about 5 wt % based on the total weight of the electrolyte membrane.

Example 2: Preparation of Electrolyte Membrane (PEO+MIL-125 ($Ti_8O_8(OH)_4(BDC)_6$ of which a Surface is Covalently Bound Through an Amide Covalent Bond to $PEG_{2000}$)

An electrolyte membrane (thickness: about 50 μm) was prepared in the same manner as in Example 1, except that the MOF (MIL-125($Ti_8O_8(OH)_4(BDC)_6$), BDC=1,4-benzenedicarboxylate), a surface of which was covalently bound to polyethylene glycol ($PEG_{2000}$) by an amide covalent bond, prepared in Preparation Example 2, was used instead of the MOF (MIL-125($Ti_8O_8(OH)_4(BDC)_6$), BDC=1,4-benzenedicarboxylate) a surface of which was covalently bound to polyethylene glycol ($PEG_{750}$) through an amide covalent bond.

The amount of the MOF (MIL-125($Ti_8O_8(OH)_4(BDC)_6$), BDC=1,4-benzenedicarboxylate) a surface of which was covalently bound to polyethylene glycol ($PEG_{2000}$) through an amide covalent bond was about 5 wt % based on the total weight of the electrolyte membrane.

Example 3: Preparation of Electrolyte Membrane (PEO+MIL-125 ($Ti_8O_8(OH)_4(BDC)_6$ a Surface of which is Covalently Bound to $PEG_{10000}$ Through an Amide Covalent Bond)

An electrolyte membrane (thickness: about 50 μm) was prepared in the same manner as in Example 1, except that the MOF (MIL-125($Ti_8O_8(OH)_4(BDC)_6$), BDC=1,4-benzenedicarboxylate), a surface of which was covalently bound to polyethylene glycol ($PEG_{10000}$) through an amide covalent bond, prepared in Preparation Example 3, was used instead of the MOF (MIL-125($Ti_8O_8(OH)_4(BDC)_6$), BDC=1,4-benzenedicarboxylate) a surface of which was covalently bound to polyethylene glycol ($PEG_{750}$) through an amide covalent bond.

The amount of the MOF (MIL-125($Ti_8O_8(OH)_4(BDC)_6$), BDC=1,4-benzenedicarboxylate) a surface of which was covalently bound to polyethylene glycol ($PEG_{10000}$) through an amide covalent bond was about 5 wt % based on the total weight of the electrolyte membrane.

Comparative Example 1: Preparation of Electrolyte Membrane (PEO)

Polyethylene oxide (PEO, 99.9%, Mw=600 k, available from Aldrich Co., Ltd.) was dissolved in 5 wt % of anhydrous tetrahydrofuran (THF, ≥99%, available from Aldrich Co., Ltd.). Lithium bis(trifluoromethanesulfonyl) imide ($LiN(SO_2CF_3)_2$, LiTFSI, available from PANAX Co., Ltd.) was added to the solution to obtain a composition. A mole ratio of ethylene oxide to lithium ions (EO/Li) in polyethylene oxide was about 16:1.

A teflon support substrate was coated with the composition by using a doctor blade (1 millimeter (mm)) and then dried at 60° C. under vacuum for about 12 hours, thereby preparing an electrolyte membrane (thickness: about 50 μm).

Comparative Example 2: Preparation of Electrolyte Membrane (PEO+MIL-125($Ti_8O_8(OH)_4(BDC)_6$)

Polyethylene oxide (PEO, 99.9%, Mw=600 k, available from Aldrich Co., Ltd.) was dissolved in 5 wt % of anhydrous tetrahydrofuran (THF, ≥99%, available from Aldrich Co., Ltd.). Lithium bis(trifluoromethanesulfonyl) imide ($LiN(SO_2CF_3)_2$, LiTFSI, available from PANAX Co., Ltd.) was added to the solution to obtain a composition. A mole ratio of ethylene oxide to lithium ions (EO/Li) in polyethylene oxide was about 16:1.

The MOF (MIL-125($Ti_8O_8(OH)_4(BDC)_6$), BDC=1,4-benzenedicarboxylate) prepared in Comparative Preparation Example 1 was added to the composition and then stirred at a rate of 250 r/min for about 12 hours under argon atmosphere to obtain a solution.

A teflon support substrate was coated with the solution by drop coating and then dried at 60° C. under vacuum for about 12 hours, thereby preparing an electrolyte membrane (thickness: about 50 μm).

The amount of the MOF (MIL-125($Ti_8O_8(OH)_4(BDC)_6$), BDC=1,4-benzenedicarboxylate) was about 5 wt % based on the total weight of the electrolyte membrane.

Comparative Example 3: Preparation of Electrolyte Membrane (PEO+$SiO_2$ of which a Surface is Chemically Bonded to PEG)

Polyethylene oxide (PEO, 99.9%, Mw=600 k, available from Aldrich Co., Ltd.) was dissolved in 5 wt % of anhydrous tetrahydrofuran (THF, ≥99%, available from Aldrich Co., Ltd.). Lithium bis(trifluoromethanesulfonyl) imide ($LiN(SO_2CF_3)_2$, LiTFSI, available from PANAX Co., Ltd.) was added to the solution to obtain a mixture. A mole ratio of ethylene oxide to lithium ions (EO/Li) in polyethylene oxide was about 16:1.

28 wt % of $SiO_2$—PEG (available from Ditto Technology Co., Ltd., Korea) was added to the mixture and stirred to obtain a composition.

A teflon support substrate was coated with the composition by using a doctor blade (1 mm) and then dried at 60° C. under vacuum for about 12 hours, thereby preparing an electrolyte membrane (thickness: about 50 μm).

Comparative Example 4: Preparation of Electrolyte Membrane (PEO+$SiO_2$)

Polyethylene oxide (PEO, 99.9%, Mw=600 k, available from Aldrich Co., Ltd.) was dissolved in 5 wt % of anhydrous tetrahydrofuran (THF, ≥99%, available from Aldrich Co., Ltd.). Lithium bis(trifluoromethanesulfonyl) imide ($LiN(SO_2CF_3)_2$, LiTFSI, available from PANAX Co., Ltd.) was added to the solution to obtain a mixture. A mole ratio of ethylene oxide to lithium ions (EO/Li) in polyethylene oxide was about 16:1.

5 wt % of $SiO_2$ (average diameter: about 7 μm) was added to the mixture and stirred to obtain a composition.

A teflon support substrate was coated with the composition by using a doctor blade (1 mm) and then dried at 60° C. under vacuum for about 12 hours, thereby preparing an electrolyte membrane (thickness: about 50 μm).

Comparative Example 5: Preparation of Electrolyte Membrane (PEO+MIL-53(Al)(Al(OH)(BDC), BDC=1,4-Benzenedicarboxylate)

Polyethylene oxide (PEO, 99.9%, Mw=600 k, available from Aldrich Co., Ltd.) was dissolved in 5 wt % of anhydrous tetrahydrofuran (THF, ≥99%, available from Aldrich Co., Ltd.). Lithium bis(trifluoromethanesulfonyl) imide ($LiN(SO_2CF_3)_2$, LiTFSI, available from PANAX Co., Ltd.) was added to the solution to obtain a composition. A mole ratio of ethylene oxide to lithium ions (EO/Li) in polyethylene oxide was about 16:1.

The MOF(MIL-53(Al)(Al(OH)(BDC), BDC=1,4-benzenedicarboxylate) prepared in Comparative Preparation Example 2 was added to the composition and then stirred at a rate of about 250 r/min for about 12 hours under argon atmosphere to obtain a solution.

A teflon support substrate was coated with the solution by drop coating and then dried at 60° C. under vacuum for about 12 hours, thereby preparing an electrolyte membrane (thickness: about 50 μm).

The amount of the MOF(MIL-53(Al)(Al(OH)(BDC), BDC=1,4-benzenedicarboxylate) was about 5 wt % based on the total weight of the electrolyte membrane.

Example 4: Preparation of Coin Cell

The electrolyte membrane prepared in Example 1 was disposed between a lithium electrode and a counter electrode formed of stainless steel, thereby preparing a coin cell.

Examples 5 to 6: Preparation of Coin Cell

A coin cell was prepared in the same manner as in Example 4, except the electrolyte membrane prepared in Examples 2 and 3 were used instead of the electrolyte membrane prepared in Example 1.

Example 7: Preparation of Lithium Secondary Battery (Full Cell)

0.02 grams (g) of the MOF (MIL-125($Ti_8O_8(OH)_4(BDC)_6$), BDC=1,4-benzenedicarboxylate), a surface of which was covalently bound to polyethylene glycol ($PEG_{10000}$) in Preparation Example 3, 10 mL of anhydrous tetrahydrofuran (THF, ≥99%, available from Aldrich Co., Ltd.), and 0.4 g of poly(diallyldimethylammonium bis(trifluoromethanesulfonyl) imide ($PDDATf_2N$) (a degree of polymerization of about 2,500) were added and stirred at room temperature (from about 20 to about 25° C.) for 5 minutes to prepare an electrolyte (negative electrode protective film) composition.

The electrolyte composition was drop-coated on a lithium metal thin film (thickness: about 20 μm), followed by thermally treating in a vacuum oven at about 40° C. for about 12 hours, thereby preparing a lithium metal negative electrode having a formed electrolyte (negative electrode protective film).

Aside from this, $LiCoO_2$, a conductive agent (Super-P; available from Timcal Ltd.), polyvinylidene fluoride (PVdF), and N-pyrrolidone were mixed together to obtain a positive electrode composition. In the positive electrode composition, a mixture weight ratio of $LiCoO_2$ to the conductive agent, and PVDF was about 97:1.5:1.5.

The positive electrode composition was coated on an aluminum foil (thickness: about 15 μm) and then dried at 25° C., followed by drying the result at about 110° C. under a vacuum atmosphere, thereby preparing a positive electrode.

The lithium metal negative electrode having a formed electrolyte (negative electrode protective film) was disposed on the positive electrode, and a separator was disposed between the positive electrode and the electrolyte, thereby preparing a lithium secondary battery (positive electrode/separator/electrolyte (negative electrode protective film)/negative electrode). As a separator, polypropylene separator (Cellgard 3510) was used.

A liquid electrolyte was injected to between the positive electrode and electrolyte of the lithium secondary battery. The liquid electrolyte was prepared by adding a lithium salt containing dissolved 1.3 molar (M) $LiPF_6$ to a solvent mixture having a volume ratio of ethylene carbonate to diethyl carbonate to fluoroethylene carbonate of about 2:6:2.

Comparative Examples 6 to 10: Preparation of Coin Cell

A coin cell was prepared in the same manner as in Example 4, except the electrolyte membrane prepared in Comparative Examples 1 to 5 were used instead of the electrolyte membrane prepared in Example 1.

Comparative Example 11: Preparation of Lithium Secondary Battery (Full Cell)

LiCoO$_2$, a conductive agent (Super-P; available from Timcal Ltd.), polyvinylidene fluoride (PVdF), and N-pyrrolidone were mixed together to obtain a positive electrode composition. In the positive electrode composition, a mixture weight ratio of the LiCoO$_2$ to the conductive agent to PVDF was about 97:1.5:1.5.

The positive electrode composition was coated on an aluminum foil (thickness: about 15 μm) and then dried at 25° C., followed by drying the result at about 110° C. under a vacuum atmosphere, thereby preparing a positive electrode.

A separator was disposed between the positive electrode and the top of the lithium metal negative electrode, thereby preparing a lithium secondary battery (positive electrode/separator/negative electrode). As a separator, polypropylene separator (Cellgard 3510) was used.

A liquid electrolyte was injected to between the positive electrode and the negative electrode. The liquid electrolyte was prepared by adding a lithium salt containing dissolved 1.3 M LiPF$_6$ to a solvent mixture having a volume ratio of ethylene carbonate to diethyl carbonate to fluoroethylene carbonate of about 2:6:2.

Comparative Example 12: Preparation of Lithium Secondary Battery (Full Cell)

10 mL of anhydrous tetrahydrofuran (THF, ≥99%, available from Aldrich Col., Ltd.) and 0.4 g of poly(diallyldimethylammonium bis(trifluoromethanesulfonyl) imide (PDDATf$_2$N) a degree of polymerization of about 2,500) were added and stirred at room temperature (from about 20 to about 25° C.) for 5 minutes to prepare an electrolyte (negative electrode protective film) composition.

The electrolyte composition was drop-coated on a lithium metal thin film (thickness: about 20 μm), followed by thermal-treating in a vacuum oven at about 40° C. for about 12 hours, thereby preparing a lithium metal negative electrode having a formed electrolyte (negative electrode protective film).

Aside from this, LiCoO$_2$, a conductive agent (Super-P; available from Timcal Ltd.), polyvinylidene fluoride (PVdF), and N-pyrrolidone were mixed together to obtain a positive electrode composition. In the positive electrode composition, a mixture weight ratio of LiCoO$_2$ to the conductive agent, and PVDF was about 97:1.5:1.5.

The positive electrode composition was coated on an aluminum foil (thickness: about 15 μm) and then dried at 25° C., followed by drying the result at about 110° C. under a vacuum atmosphere, thereby preparing a positive electrode.

The lithium metal negative electrode having a formed electrolyte (negative electrode protective film) was disposed on the positive electrode, and a separator was disposed between the positive electrode and the electrolyte, thereby preparing a lithium secondary battery (positive electrode/separator/electrolyte (negative electrode protective film)/negative electrode). As a separator, polypropylene separator (Cellgard 3510) was used.

A liquid electrolyte was injected to between the positive electrode and electrolyte of the lithium secondary battery. The liquid electrolyte was prepared by adding a lithium salt containing dissolved 1.3 M LiPF$_6$ to a solvent mixture having a volume ratio of ethylene carbonate to diethyl carbonate to fluoroethylene carbonate of about 2:6:2.

Analysis Example 1: Confirmation of Presence of Ionically Conductive Polymer MOF a Surface of which is Covalently Bound Through an Amide Covalent Bond (1) Analysis of Transmission Electron Microscopy-Energy Dispersive Spectroscopy (TEM-EDS)

Elements mapping analysis was performed on the MOF prepared in Preparation Example 2 by using a transmission electron microscopy (TEM) analyzer and an energy dispersive spectroscopy (EDS) analyzer. The results thereof are shown in FIGS. 2A to 2C.

The TEM analyzer was Cubed G2, available from Titan Co., Ltd., and the EDS analyzer was S-4700, available from Hitachi Co., Ltd.

Figure 2A:
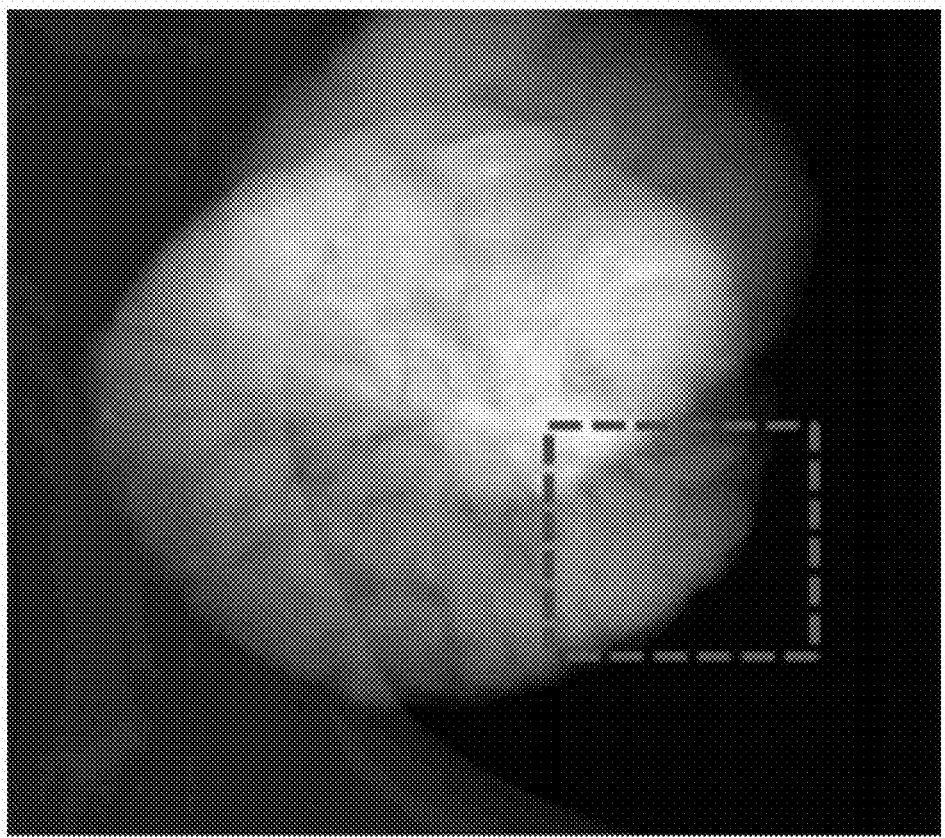
FIGS. 2A to 2C are images obtained as a result of transmission electron microscopy-energy dispersive spectroscopy (TEM-EDS) analysis on the MOF prepared in Preparation Example 2.
Figure 2B:
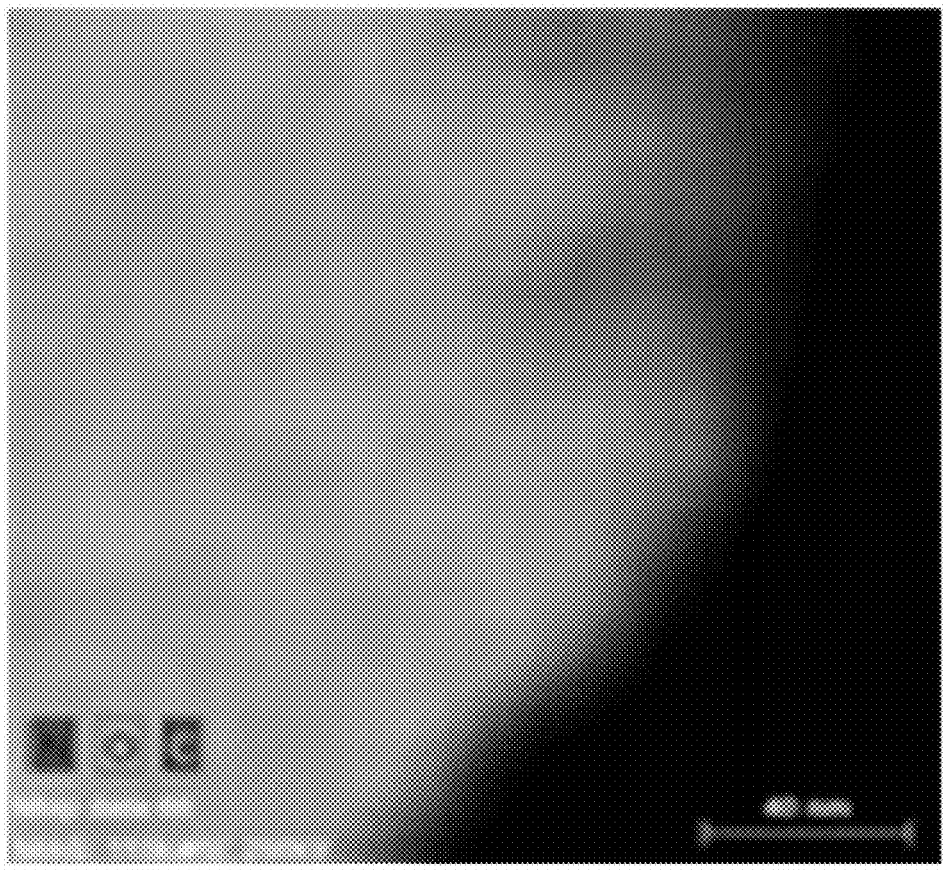
Figure 2C:
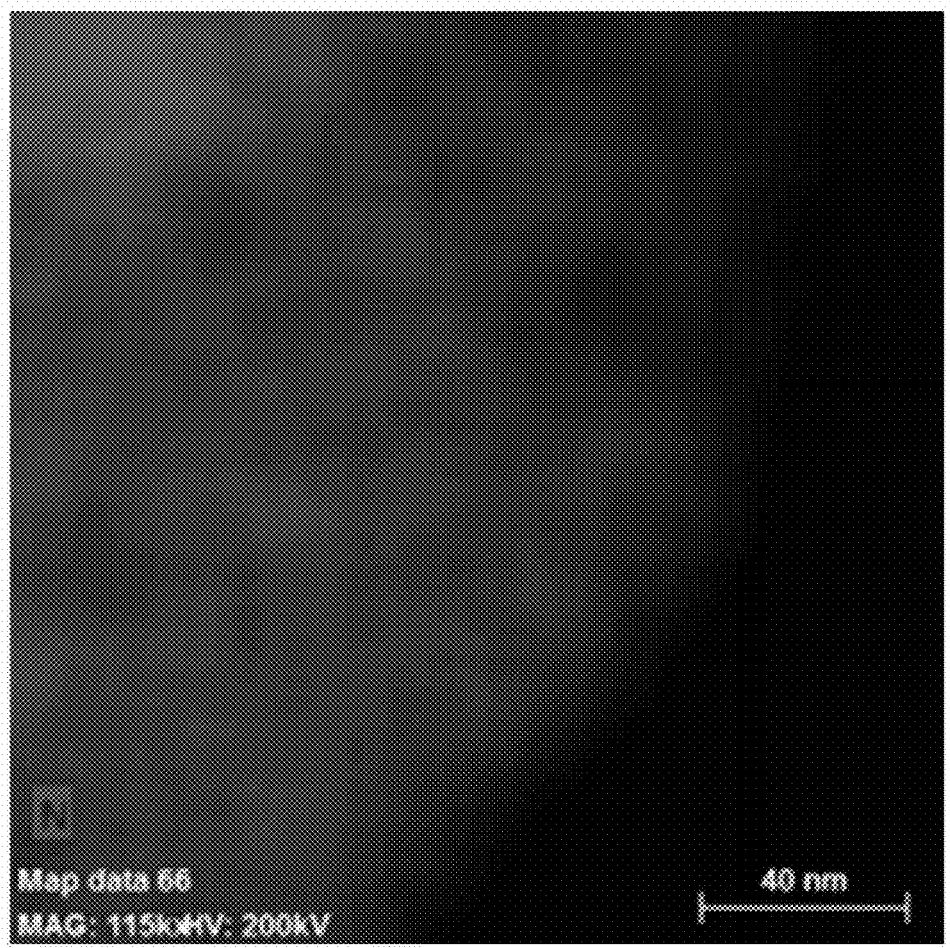

Referring to FIGS. 2A to 2C, in the dashed box in FIGS. 2A, N, O, and C elements are shown. N, O, and C elements are shown in FIG. 2B, and the N element is shown in FIG. 2C. Due to the presence of N element, the presence of polyethylene glycol (PEG$_{2000}$) covalently bound through an amide covalent bond to a surface of the MOF is confirmed.

(2) Analysis of X-Ray Photoelectron Spectroscopy (XPS)

A piece of double-sided tape was applied to a metal plate, and test samples of the MOF (MIL-125(Ti$_8$O$_8$(OH)$_4$(BDC)$_6$), BDC=1,4-benzenedicarboxylate) prepared in Preparation Example 2 and the MOF prepared in Comparative Preparation Example 1 were sprinkled thereon such that the piece of double-sided tape was not seen. Then, the surface was flattened, followed by compressing the surface and fixing the surface to a folder. X-ray photoelectron spectroscopy (XPS) was performed thereon. The N1s spectrum analysis result is shown in FIG. 3.

In order to perform XPS analysis, Al-Kα ray (1486.6 electron volt (eV), 27.7 Watts (W), measured area: 0.1 square millimeters (mm$^2$)) was used as a light source, and a Quantera II XPS Scanning Microprobe, available from Ulvac PHI, was used as a measuring probe.

Figure 3:
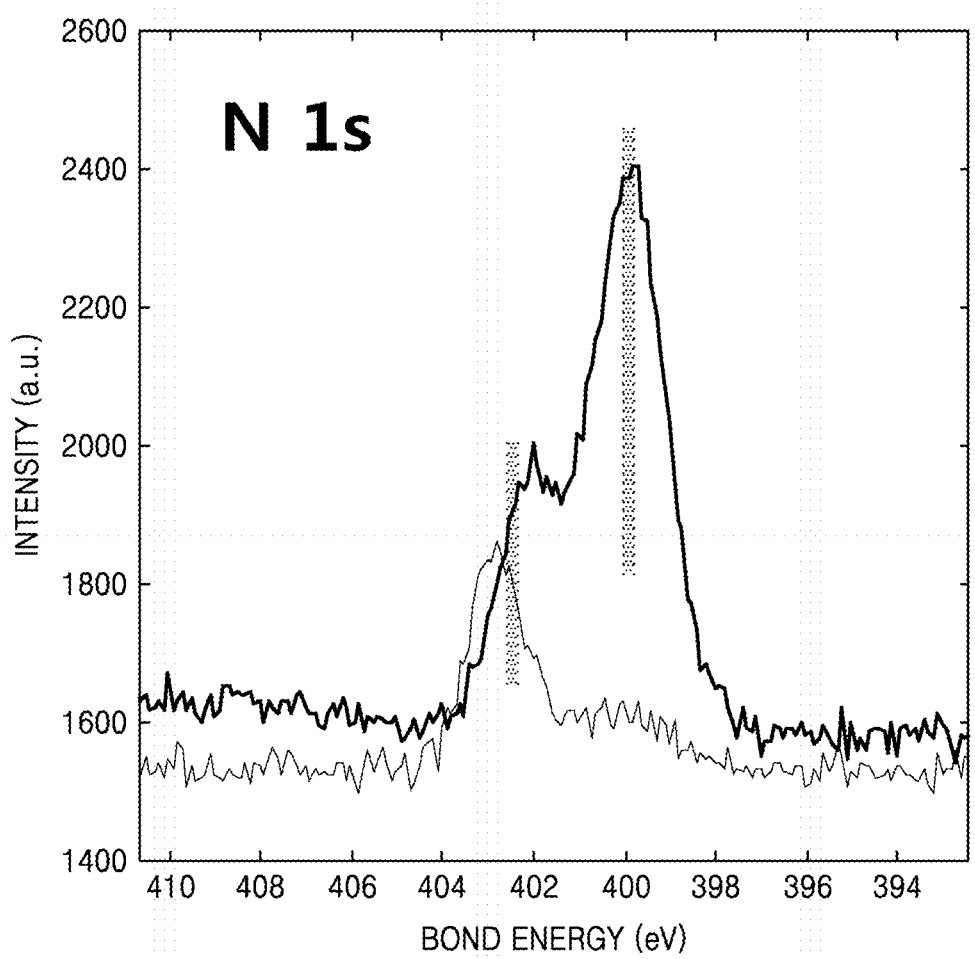
FIG. 3 is a graph of intensity (arbitrary units, a. u.) versus bond energy (electron Volt, eV) illustrating the result of X-ray photoelectron spectroscopy (XPS) analysis on the MOF prepared in Preparation Example 2.

Referring to FIG. 3, a peak of the binding energy of the MOF prepared in Preparation Example 2 was observed at 400 eV. The peak indicates the presence of N—C bond.

On the other hand, a peak of the binding energy of the MOF prepared in Comparative Preparation Example 1 was not observed at 400 eV.

Accordingly, it was found that PEG$_{2000}$ was covalently bound through an amide covalent bond to the surface of the MOF prepared in Preparation Example 2.

(3) FT-IR Analysis

Figure 4:
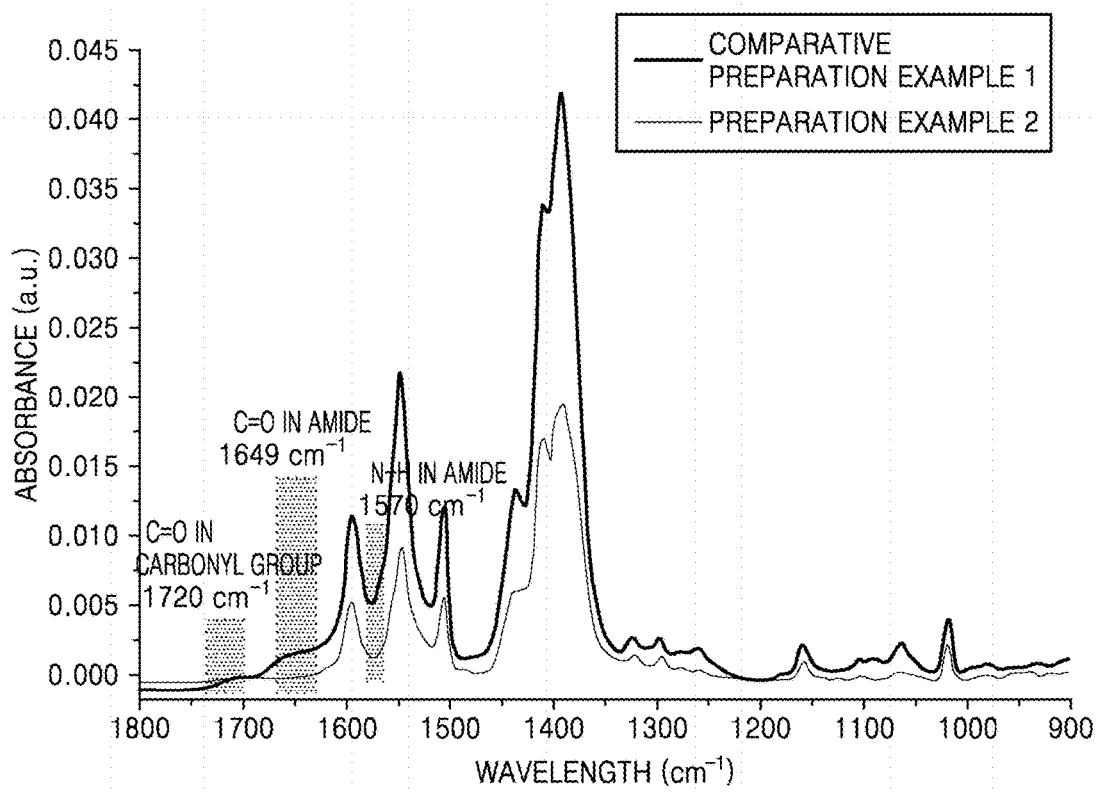
FIG. 4 is a graph of absorbance (arbitrary units, a. u.) versus wavelength (reverse centimeters, $cm^{-1}$) illustrating the results of FT-IR analysis on the MOFs prepared in Preparation Example 2 and Comparative Preparation Example 1.

FT-IR analysis was performed on the MOFs prepared in Preparation Example 2 and Comparative Preparation Example 1. The results thereof are shown in FIG. 4. VERTEX70, available from Bruker Co., Ltd., was used in FT-IR analysis.

Referring to FIG. 4, C=O in amide bond was observed at a wave number of about 1649 reverse centimeters (cm$^{-1}$), and N—H in amide bond was observed at a wave number of about 1570 cm$^{-1}$. Accordingly, it was found that PEG is covalently bound to a surface of the MOF.

(4) Thermogravimetric Analysis (TGA)

Thermogravimetric Analysis (TGA) was performed on the MOFs prepared in Preparation Example 2 and Comparative Preparation Example 1. SDF-2960, available from TA instrument, was used as a thermogravimetric analyzer. The results thereof are shown in FIG. 5.

Figure 5:
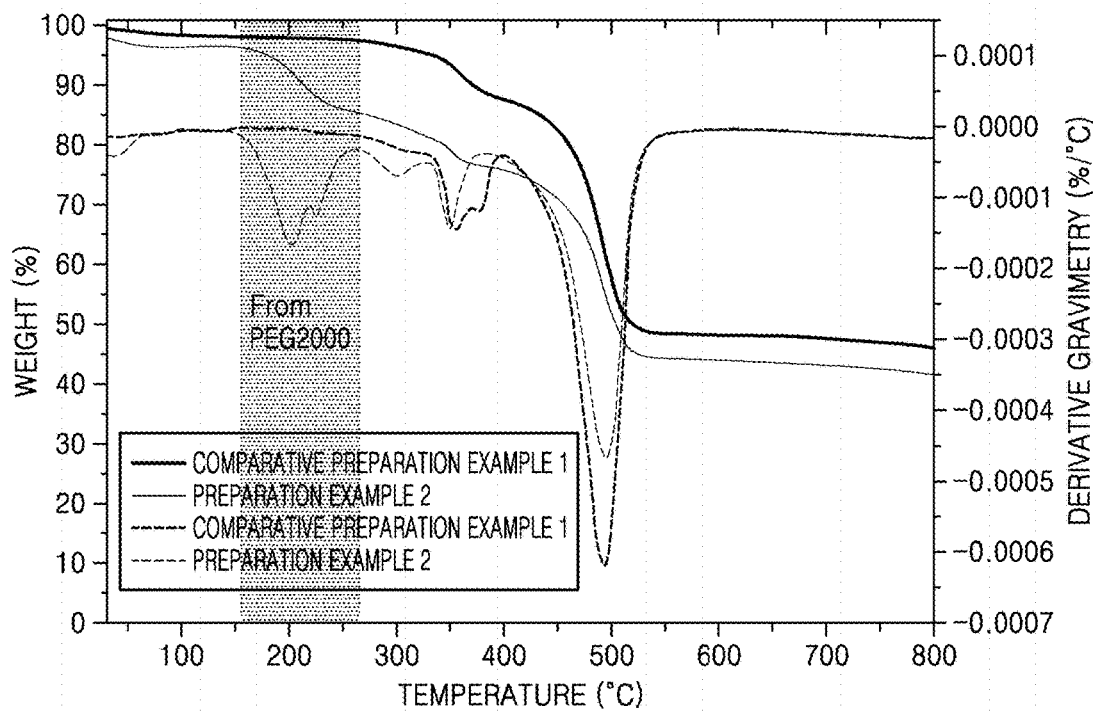
FIG. 5 is a graph of weight (percent, %) versus temperature (degrees Centigrade, ° C.) illustrating the results of thermogravimetric analysis (TGA) on the MOFs prepared in Preparation Example 2 and Comparative Preparation Example 1.

Referring to FIG. 5, about 4.35 wt % of thermogravimetric loss was observed at about 200° C. Accordingly, the amount of PEG forming amide covalent bonds with the MOF prepared in Preparation Example 2 was confirmed.

Evaluation Example 1: Electrochemical Characteristics Evaluation of Electrolyte Membrane (1) X-ray Diffraction (XRD) Evaluation X-ray diffraction evaluation using Cu Kα was performed on the electrolyte membranes prepared in Examples 1 to 3 and Comparative Examples 1 and 2. The results thereof are shown in FIG. 6.

The evaluation was performed by using Rigaku RINT2200HF+ diffractometer using Cu Kα radiation (1.540598 Angstroms (Å)).

Figure 6:
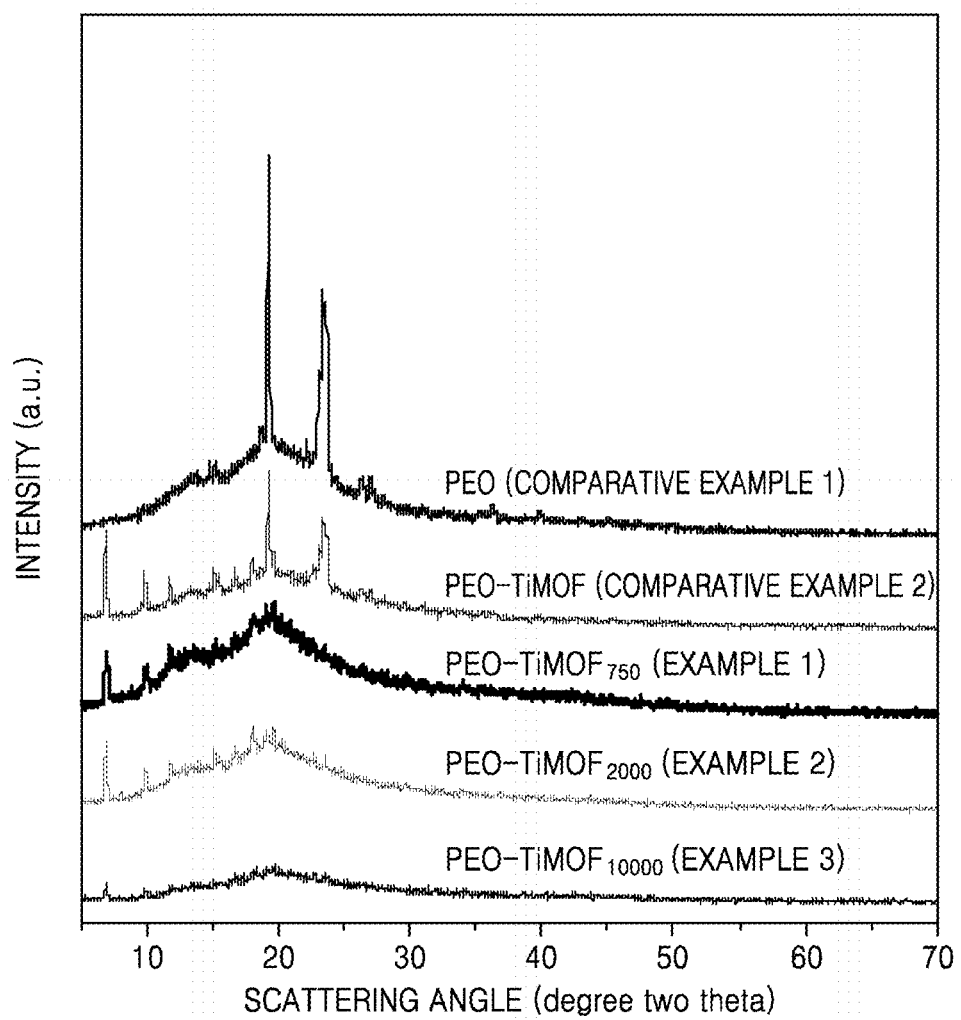
FIG. 6 is a graph of intensity (arbitrary units, a. u.) versus scattering angle (degree 2 theta) illustrating the results of X-ray diffraction (XRD) evaluation on the electrolyte membranes prepared in Examples 1 to 3 and Comparative Examples 1 and 2.

Referring to FIG. 6, it was found that crystallinities of the electrolyte membranes prepared in Examples 1 to 3 were lower than those of the electrolyte membranes prepared in Comparative Examples 1 and 2. In addition, it was found that the crystallinities of the electrolyte membranes prepared in Example 1, Example 2, and Example 3 decreased in the stated order. Accordingly, it was found that as the chain length of PEG present on the surface of the MOF, which was included in the electrolyte prepared in Examples 1 to 3, increases, crystallinities of the electrolyte membranes decrease.

(2) Ion Conductivity Measurement Evaluation

Figure 7A:
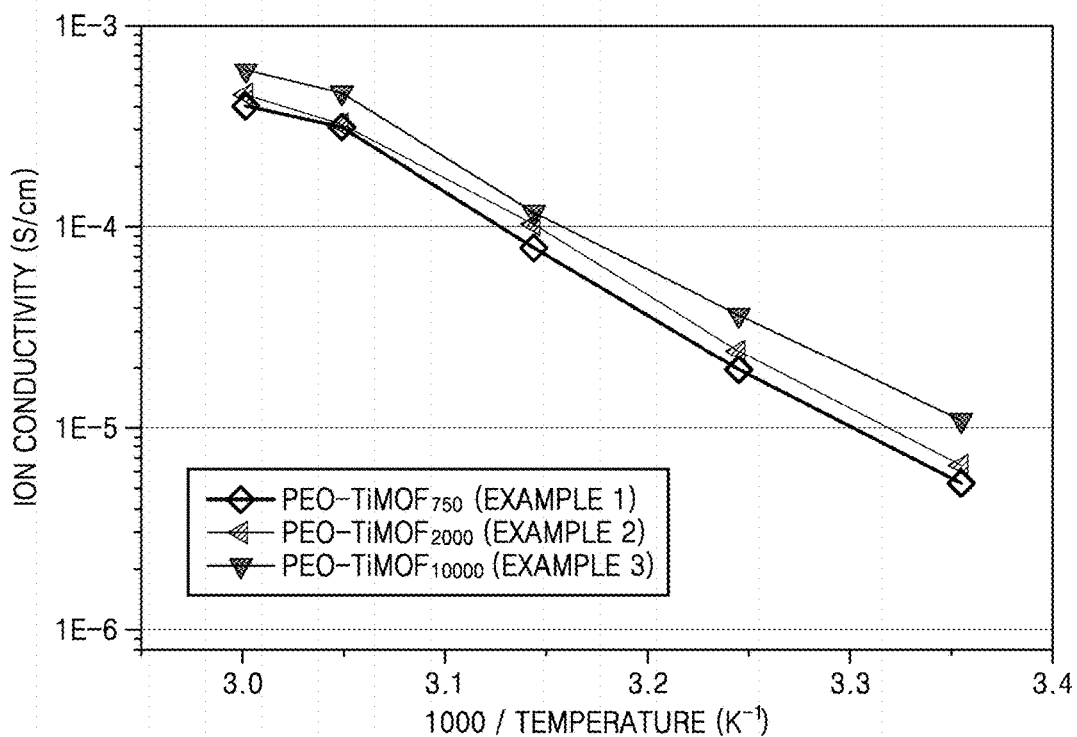
FIG. 7A is a graph of ion conductivity (Siemens per centimeter) versus temperature (1,000/Kelvin, 1,000/K) illustrating the results of ion conductivity measurement evaluation on the electrolyte membranes prepared in Example 1 to 3.
Figure 7B:
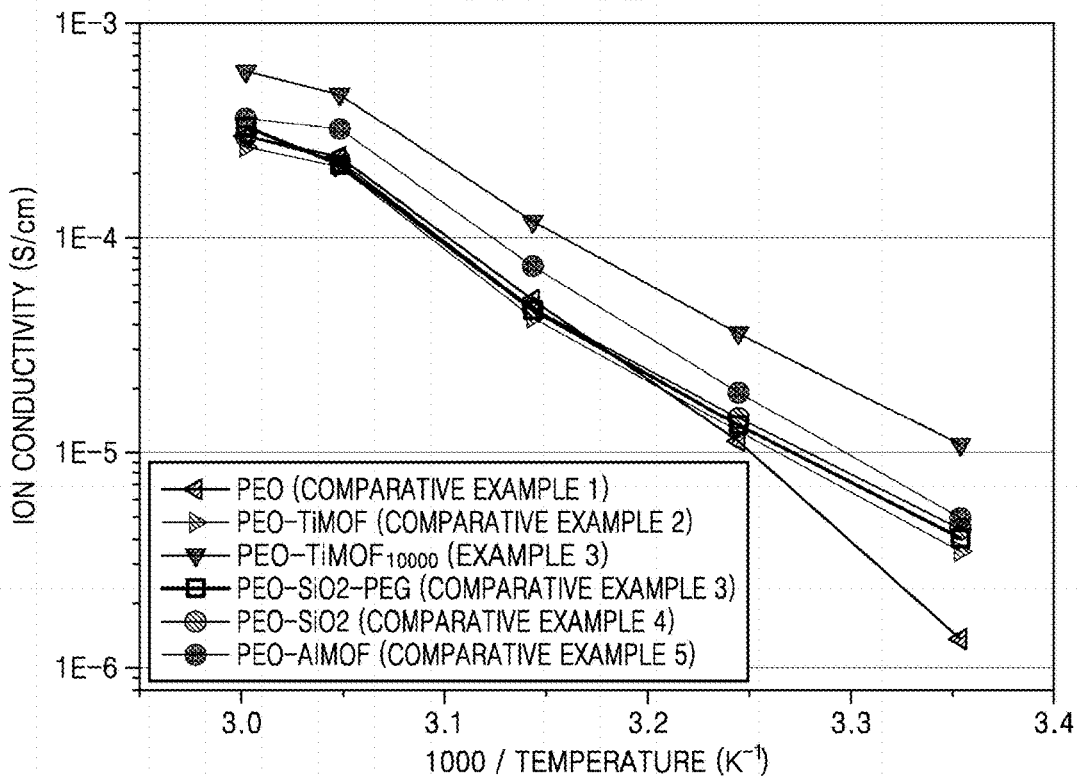
FIG. 7B is a graph of ion conductivity (Siemens per centimeter) versus temperature (1,000/Kelvin, 1,000/K) illustrating the results of ion conductivity measurement evaluation on the electrolyte membranes prepared in Example 3 and Comparative Examples 1 to 5.

Ion conductivities of the electrolyte membranes prepared in Examples 1 to 3 and Comparative Examples 1 to 5 were measured according to the following method. Ion conductivity measurement was performed by applying 10 milli Volts (mV) of a voltage bias in a frequency range of about 1 Hertz (Hz) to about 1 mega Hertz (MHz) to the electrolyte membranes prepared in Examples 1 to 3 and Comparative Examples 1 to 5, followed by scanning the temperature to measure the resistance. The results thereof are shown in FIGS. 7A, 7B, and Table 1. Table 1 shows ion conductivities of the electrolyte membranes at 25° C.

TABLE 1

| Classification | Ion conductivity at 25° C. (S/cm) |
| --- | --- |
| Example 1 | $5.33 \times 10^{-6}$ |
| Example 2 | $6.57 \times 10^{-6}$ |
| Example 3 | $1.11 \times 10^{-5}$ |
| Comparative Example 1 | $1.37 \times 10^{-6}$ |
| Comparative Example 2 | $3.47 \times 10^{-6}$ |
| Comparative Example 3 | $4.08 \times 10^{-6}$ |
| Comparative Example 4 | $4.51 \times 10^{-6}$ |
| Comparative Example 5 | $5.00 \times 10^{-6}$ |

Referring to Table 1 and FIGS. 7A and 7B, it was found that the electrolyte membranes prepared in Examples 1 to 3 had higher ion conductivity than the electrolyte membranes prepared in Comparative Examples 1 to 5. In detail, the ion conductivity of the electrolyte membrane prepared in Example 3 was about 3.19 times to about 8.08 times higher than the electrolyte membranes prepared in Comparative Examples 1 to 5. In addition, it was found that as the chain length of PEG present on the surface of the MOF, which was included in the electrolyte prepared in Examples 1 to 3, increases, ion conductivities increased.

(3) Linear Sweep Voltammetry (LSV) Evaluation

Figure 8:
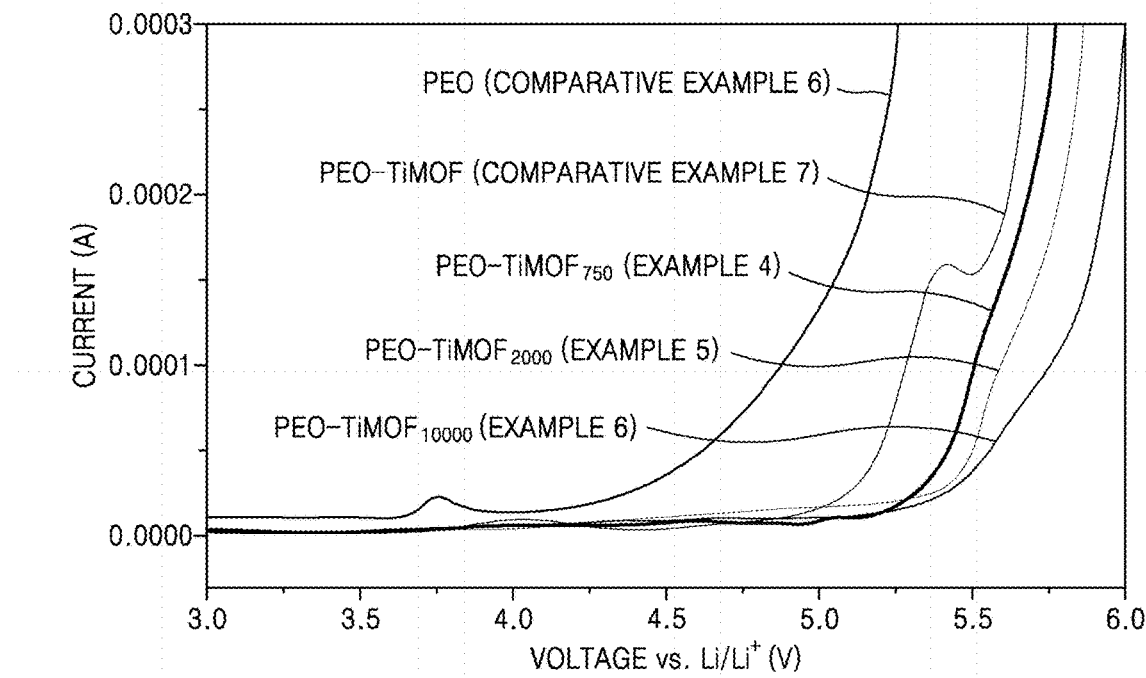
FIG. 8 is a graph of current (Amperes, A) versus voltage vs. Li/Li$^+$ (Volts, V) illustrating the results of linear sweep voltammetry (LSV) evaluation on the cells prepared in Examples 4 to 6 and Comparative Examples 5 to 7.

Linear sweep voltammetry (LSV) was performed on the cells prepared in Examples 4 to 6 and Comparative Examples 6 and 7 to evaluate electrochemical stability thereof. The results thereof are shown in FIG. 8 and Table 2.

The measurement conditions of the LSV was at a temperature of about 60° C. in a voltage range of about 3 Volts (V) to about 6 V (V vs. Li/Li$^+$), and a scan rate of about 1 milli Volts per second (mV/s).

TABLE 2

| Classification | Electrochemical stability (V) |
| --- | --- |
| Example 4 | 5.35 V |
| Example 5 | 5.35 V |
| Example 6 | 5.35 V |
| Comparative Example 6 | 4.35 V |
| Comparative Example 7 | 5.05 V |

Referring to FIG. 8 and Table 2, it was found that the cells prepared in Example 4 to 6 had improved electrochemical stability compared to the cells prepared in Comparative Examples 6 and 7. In the case of the electrolyte membrane containing the MOF (MIL-125(Ti$_8$O$_8$(OH)$_4$(BDC)$_6$), BDC=1,4-benzenedicarboxylate), by adding additional particles, the improvement effect of electrochemical stability of the matrix may be confirmed. In the case of the electrolyte membrane containing the MOF (MIL-125(Ti$_8$O$_8$(OH)$_4$(BDC)$_6$), BDC=1,4-benzenedicarboxylate) covalently bound through an amide covalent bond to polyethylene glycol, due to the modifying of polyethylene glycol to —COOH present on the surface of the MOF, it was found that the reactivity of the surface of the MOF decreases, and the degree of dispersion in the matrix improves, improving electrochemical stability.

Figure 9:
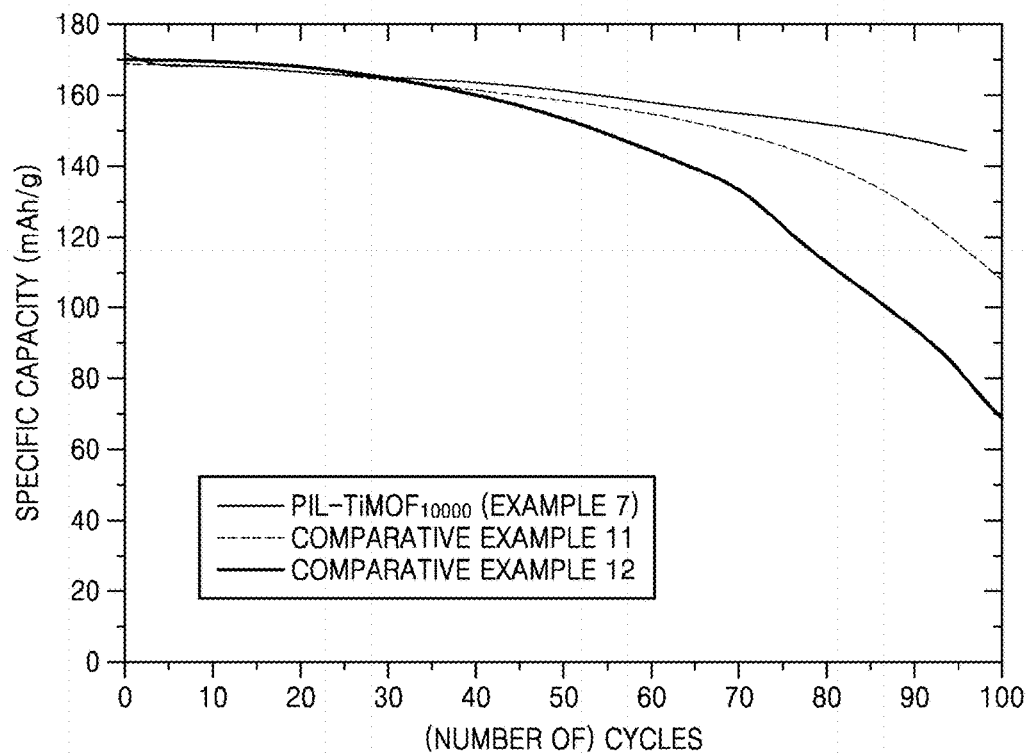
FIG. 9 is a graph of specific capacity (milli Ampere hours per gram, mAh/g) versus number of cycles illustrating the results of charging and discharging characteristics evaluation on the lithium secondary batteries prepared in Example 7 and Comparative Examples 9 and 10.

Evaluation Example 2: Charging and Discharging Characteristics Evaluation of Electrolyte Membrane Lithium secondary batteries prepared in Example 7 and Comparative Examples 11 and 12 were subject to 100 cycles of charging and discharging under a condition of a voltage range of about 3.0 V to about 4.4 V vs a lithium metal and a constant current of about 1.9 milli Amperes per square centimeter (mA/cm$^2$) at room temperature (from about 20 to about 25° C.). The results thereof are shown in FIG. 9. The capacity retention rate at 95$^{th}$ cycle of Table 3 may be represented by Mathematical Equation 1.

Capacity retention rate (%)=[(discharging capacity at 95$^{th}$ cycle/discharging capacity at 1$^{st}$ cycle)]×100    Mathematical Equation 1

TABLE 3

| Classification | Discharging capacity at 1$^{st}$ cycle (mAh/g) | Discharging capacity at 95$^{th}$ cycle (mAh/g) | Capacity retention rate (%) |
| --- | --- | --- | --- |
| Example 7 | 172.65 | 144.78 | 83.85 |
| Comparative Example 11 | 169.40 | 118.62 | 70.02 |
| Comparative Example 12 | 170.33 | 82.34 | 48.34 |

Referring to Table 3 and FIG. 9, the discharging capacity at 95$^{th}$ cycle of the lithium secondary battery prepared in Example 7 improved 81% and 24%, compared to the lithium secondary batteries prepared in Comparative Examples 11 and 12 respectively. In addition, the capacity retention rate of the lithium secondary battery prepared in Example 7 was higher than the lithium secondary batteries prepared in Comparative Examples 9 and 10. Accordingly, it was found that cycle stability of the lithium secondary battery prepared in Example 7 improved compared to the lithium secondary batteries prepared in Comparative Examples 9 and 10.

As described above, the electrolyte membrane for an energy storage device, in which an ionically conductive polymer, which has high ion conductivity and is miscible with a matrix including an ionically conductive polymer may be covalently bound to a surface of an MOF through an amide covalent bond, may improve mechanical properties and decreases the degree of crystallinity, thereby improving ion conductivity at room temperature. Further, the electrolyte membrane for an energy storage device may improve mechanical properties and electrochemical stabilities.

It should be understood that exemplary embodiments described herein should be considered in a descriptive sense only and not for purposes of limitation. Descriptions of features or aspects within each exemplary embodiment should typically be considered as available for other similar features or aspects of the present inventive concept in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrolyte membrane for an energy storage device, the membrane comprising:
   a matrix comprising a first ionically conductive polymer;
   an alkali metal salt, an alkaline earth metal salt, or a combination thereof;
   a metal-organic framework, and
   a second ionically conductive polymer miscible with the ionically conductive polymer comprised in the matrix, and covalently bonded to a portion of or an entire surface of the metal-organic framework through at least one amide covalent bond,
   wherein the alkali metal salt is LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, LiSbF$_6$, Li(CF$_3$SO$_2$)$_3$C, LiN(SO$_2$C$_2$F$_5$)$_2$, LiN(SO$_2$CF$_3$)$_2$, LiN(SO$_2$CF$_2$CF$_3$)$_2$, LiN(CF$_3$SO$_2$)$_2$, LiPF$_3$(CF$_2$CF$_3$)$_3$, LiPF$_3$(C$_2$F$_5$)$_3$, LiPF$_3$(CF$_3$)$_3$, LiB(C$_2$O$_4$)$_2$, NaSCN, NaSO$_3$CF$_3$, KTFSI, NaTFSI, Ba(TFSI)$_2$, Pb(TFSI)$_2$, Ca(TFSI)$_2$, or LiPF$_3$(CF$_2$CF$_3$)$_3$, and
   wherein the alkaline earth metal salt is Ba(TFSI)$_2$, Pb(TFSI)$_2$, or Ca(TFSI)$_2$.

2. The electrolyte membrane of claim 1, wherein the second ionically conductive polymer miscible with the first ionically conductive polymer of the matrix is a polymer derived from poly(ethylene oxide), poly(propylene oxide), poly(butylene oxide), poly(oxyethylene) methacrylate, polyvinyl alcohol, polyacrylonitrile, polyimide, polyvinyl chloride, polyacrylic acid, poly(ethylene glycol), poly(ethylene glycol) diacrylate, poly(propylene glycol) diacrylate, poly(ethylene glycol) dimethacrylate, poly(propylene glycol) dimethacrylate, poly(ethylene glycol) urethane diacrylate, poly(ethylene glycol)urethane dimethacrylate, polyester diacrylate, polyester dimethacrylate, poly(ethylene glycol)urethane triacrylate, poly(ethylene glycol)urethane trimethacrylate, or a combination thereof, a polymer comprising a reaction product of trimethylolpropane triacrylate, trimethylolpropane trimethacrylate, trimethylolpropane triacrylate substituted with an ethoxy group, trimethylolpropane triacrylate substituted with a propoxy group, glyceryl triacrylate, glyceryl trimethacrylate, tetramethylolpropane tetraacrylate, di(trimethylolpropane) tetraacrylate, a combination thereof, or a copolymer thereof.

3. The electrolyte membrane of claim 1, wherein the second ionically conductive polymer miscible with the first ionically conductive polymer of the matrix comprises a structure unit represented by Formula 1:

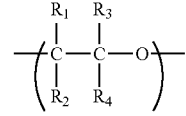

Formula 1 wherein, in Formula 1,
R$_1$, R$_2$, R$_3$, and R$_4$ are each independently a hydrogen, a hydroxy group, —C(=O)R$_a$, —C(=O)OR$_a$, —OCO(OR$_a$), a substituted or unsubstituted C$_1$-C$_{20}$ alkyl group, a substituted or unsubstituted C$_1$-C$_{20}$ alkoxy group, a substituted or unsubstituted C$_2$-C$_{20}$ alkenyl group, a substituted or unsubstituted C$_2$-C$_{20}$ alkynyl group, a substituted or unsubstituted C$_3$-C$_{30}$ cycloalkyl group, a substituted or unsubstituted C$_6$-C$_{30}$ aryl group, a substituted or unsubstituted C$_6$-C$_{30}$ aryloxy group, a substituted or unsubstituted C$_6$-C$_{30}$ heteroaryl group, or a combination thereof,
wherein R$_a$ is a hydrogen, C$_1$-C$_{10}$ alkyl group, and C$_6$-C$_{20}$ aryl group; and
an average molecular weight of the second ionically conductive polymer miscible with the first ionically conductive polymer of the matrix is in a range of about 100 to about 50,000 Daltons.

4. The electrolyte membrane of claim 1, wherein the metal-organic framework is porous and crystalline, and comprises a metal ion or a metal ion cluster chemically bound to an organic ligand.

5. The electrolyte membrane of claim 4, wherein the metal ion comprises Ti$^{3+}$, Ti$^{4+}$, Fe$^{2+}$, Fe$^{3+}$, V$^{4+}$, V$^{3+}$, V$^{2+}$, Y$^{3+}$, Zr$^{4+}$, Cu$^{2+}$, Al$^{3+}$, Si$^{4+}$, Si$^{2+}$, Cr$^{3+}$, Ga$^{3+}$, Mg$^{2+}$, Zn$^{2+}$, Zn$^{+3}$, Mn$^{2+}$, Mn$^{3+}$, Mn$^{4+}$, or a combination thereof.

6. The electrolyte membrane of claim 4, wherein the organic ligand comprises an aromatic dicarboxylic acid, an aromatic tricarboxylic acid, an imidazole compound, a tetrazole compound, a triazole compound, a pyrazole compound, an aromatic sulfonic acid, an aromatic phosphoric acid, an aromatic sulfinic acid, an aromatic phosphinic acid, a non-pyridine compound, or a combination thereof.

7. The electrolyte membrane of claim 1, wherein the metal-organic framework comprises a third ionically conductive polymer miscible with the first ionically conductive polymer of the matrix, and covalently bonded to a portion of or an entire surface of the metal-organic framework through at least one amide covalent bond.

8. The electrolyte membrane of claim 1, wherein a ratio of a total size of the metal-organic framework to a size of the metal-organic framework bound to the second ionically conductive polymer miscible with the first ionically conductive polymer of the matrix is in a range of about 1.0 to about 2.0.

9. The electrolyte membrane of claim 1, wherein a total size of the metal-organic framework is in a range of about 1 nanometer to about 1 micrometer, a specific surface area of the metal-organic framework is about 100 square meters per gram or greater, and an average pore diameter of the metal-organic framework is in a range of about 0.1 nanometers to about 10 nanometers.

10. The electrolyte membrane of claim 1, wherein an amount of the metal-organic framework is in a range of about 0.1% by weight to 50% by weight based on a total weight of the electrolyte membrane.

11. The electrolyte membrane of claim 1, wherein the first ionically conductive polymer of the matrix is a homopolymer or a block copolymer.

12. The electrolyte membrane of claim 11, wherein the block copolymer comprises poly(ethylene oxide)-b-poly(propylene oxide), poly(ethylene oxide)-b-poly(propylene oxide)-b-poly(ethylene oxide), poly(ethylene oxide)-b-poly(methyl methacrylate), poly(methyl methacrylate)-b-poly(ethylene oxide)-b-poly(methyl methacrylate), poly(ethylene oxide)-b-poly(styrene), poly(styrene)-b-poly(ethylene oxide)-b-poly(styrene), or a combination thereof.

13. The electrolyte membrane of claim 1, further comprising an ionic liquid, a plurality of inorganic particles, or a combination thereof.

14. An energy storage device, the device comprising:
a positive electrode;
a negative electrode; and
an electrolyte membrane according to claim 1 disposed between the positive electrode and the negative electrode.

15. The energy storage device of claim 14, further comprising a liquid electrolyte, a solid electrolyte, a gel electrolyte, a polymer ionic liquid, or a combination thereof disposed on the electrolyte membrane.

16. The energy storage device of claim 15, wherein the energy storage device comprises a liquid electrolyte, a gel electrolyte, an ionic liquid, a plurality of inorganic particles, a separator, or a combination thereof.

17. The energy storage device of claim 14, wherein the negative electrode is a lithium metal electrode or a lithium metal alloy electrode.

18. A method of preparing an electrolyte membrane for an energy storage device, the method comprising:
contacting (i) a matrix comprising a first ionically conductive polymer, (ii) an alkali metal salt, an alkaline earth metal salt, or a combination thereof, and (iii) a solvent to obtain a composition;
contacting (i) a metal-organic framework precursor, (ii) a second ionically conductive polymer miscible with the first ionically conductive polymer, and (iii) a catalyst to form a metal-organic framework, wherein the second ionically conductive polymer is bound to a surface of the metal-organic framework through at least one amide covalent bond; and
coating a substrate with a combination of the composition and the metal-organic framework to form an electrolyte membrane according to claim 1.

19. The method of claim 18, wherein the catalyst comprises 1-ethyl-3-(3-dimethylamino propyl) carbodiimide, N-hydroxy succinimide, boronic acid, ruthenium, a 1,2,4-triazole derivative salt, or a combination of at least two of the foregoing.

* * * * *